US010411856B2

(12) United States Patent
Sun et al.

(10) Patent No.: US 10,411,856 B2
(45) Date of Patent: Sep. 10, 2019

(54) REFERENCE SIGNAL AND TRANSMIT POWER RATIO DESIGN FOR NON-ORTHOGONAL TRANSMISSIONS

(71) Applicant: QUALCOMM Incorporated, San Diego, CA (US)

(72) Inventors: Jing Sun, San Diego, CA (US); Tao Luo, San Diego, CA (US); Hao Xu, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 14/866,313

(22) Filed: Sep. 25, 2015

(65) Prior Publication Data
US 2016/0119096 A1 Apr. 28, 2016

Related U.S. Application Data

(60) Provisional application No. 62/068,933, filed on Oct. 27, 2014.

(51) Int. Cl.
*H04L 5/00* (2006.01)
*H04W 72/04* (2009.01)
(Continued)

(52) U.S. Cl.
CPC ......... *H04L 5/0048* (2013.01); *H04B 17/318* (2015.01); *H04L 27/2601* (2013.01);
(Continued)

(58) Field of Classification Search
CPC .................................................. H04L 5/0048
See application file for complete search history.

(56) References Cited

U.S. PATENT DOCUMENTS

2012/0327795 A1* 12/2012 Mallik ................. H04B 17/345
370/252
2014/0050279 A1 2/2014 Kishiyama
2015/0349866 A1 12/2015 Benjebbour et al.

FOREIGN PATENT DOCUMENTS

EP 2941037 A1 11/2015
JP 2014131202 A 7/2014
(Continued)

OTHER PUBLICATIONS

Intel Corporation, "Discussion on PDSCH Interference Signal parameters Detection for NAICS," 3GPP TSG-RAN WG4 Meeting #70, R4-140609, Prague, Czech Republic, Feb. 10-14, 2014, 14 pgs., 3rd Generation Partnership Project.
(Continued)

*Primary Examiner* — Sulaiman Nooristany
(74) *Attorney, Agent, or Firm* — Holland & Hart LLP

(57) ABSTRACT

Techniques are provided for reference signal transmissions and transmit power ratio determination in non-orthogonal transmissions. A traffic-to-pilot power ratio (TPR) may be determined for a base layer for a non-orthogonal channel and another TPR may be determined for an enhancement layer for the non-orthogonal channel. Reference signal transmissions may be transmitted by a base station at a reference signal transmission power, and a user equipment (UE) may estimate channel quality for the base layer or the enhancement layer based at least in part on an energy level of the received reference signal and one or more of the first TPR or the second TPR. A base station may transmit TPR signaling that may indicate one or more TPR values for one or both of the base layer or enhancement layer.

29 Claims, 14 Drawing Sheets

(51) Int. Cl.
    *H04W 72/08*       (2009.01)
    *H04L 27/26*       (2006.01)
    *H04W 76/27*       (2018.01)
    *H04B 17/318*     (2015.01)
    *H04W 52/32*       (2009.01)

(52) U.S. Cl.
    CPC ..... *H04W 72/042* (2013.01); *H04W 72/0473* (2013.01); *H04W 72/082* (2013.01); *H04W 76/27* (2018.02); *H04W 52/325* (2013.01)

(56) References Cited

FOREIGN PATENT DOCUMENTS

| | | |
|---|---|---|
| JP | 2014155092 A | 8/2014 |
| JP | 2017516409 A | 6/2017 |
| WO | WO-2014030501 A1 | 2/2014 |
| WO | WO-2014104117 A1 | 7/2014 |
| WO | WO-2015172330 A1 | 11/2015 |

OTHER PUBLICATIONS

ISA/EPO, International Search Report and Written Opinion of the International Searching Authority, Int'l. App. No. PCT/US2015/052644, Nov. 24, 2015, European Patent Office, Rijswijk, NL, 13 pgs.

\* cited by examiner

REFERENCE SIGNAL AND TRANSMIT POWER RATIO DESIGN FOR NON-ORTHOGONAL TRANSMISSIONS

CROSS REFERENCES

The present Application for Patent claims priority to U.S. Provisional Patent Application No. 62/068,933 by Sun et al., entitled "Reference Signal and Transmit Power Ratio Design for NOMA Transmissions," filed Oct. 27, 2014, assigned to the assignee hereof, and expressly incorporated by reference herein.

FIELD

The present disclosure, for example, relates to wireless communication systems, and more particularly to techniques for reference signal transmission and power ratio design between base layer and enhancement layer transmissions for non-orthogonal transmissions.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and non-orthogonal multiple access (NOMA) systems. Additionally, some systems may operate using time-division duplex (TDD), in which a single carrier is used for both uplink and downlink communications, and some systems may operate using frequency-division duplex (FDD), in which separate carrier frequencies are used for uplink and downlink communications.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

As wireless communications systems become more congested, operators are seeking ways to increase capacity. Various approaches include the use of small cells, multiple-input multiple-output (MIMO) techniques, the use of an unlicensed radio frequency spectrum band, and/or the use of wireless local area networks (WLANs) to offload some of the traffic and/or signaling of a wireless communication system. Another approach includes the transmission of non-orthogonal downlink signals to increase the capacity of a wireless communication system. Many of the approaches for enhancing capacity may cause interference with concurrent communications in a cell. In order to provide enhanced data rates through a wireless communication system, it may be beneficial to estimate and mitigate such interference.

SUMMARY

The present disclosure, for example, relates to one or more techniques for reference signal transmissions and transmit power ratio determination in non-orthogonal transmissions. In some examples, a traffic-to-pilot power ratio (TPR) may be determined for a base layer for a non-orthogonal channel and another TPR may be determined for an enhancement layer for the non-orthogonal channel. Reference signal transmissions may be transmitted by a base station at a reference signal transmission power, and a user equipment (UE) may estimate channel quality for the base layer or the enhancement layer based on an energy level of the received reference signal and one or more of the first TPR or the second TPR. A base station may, in certain examples, transmit TPR signaling that may indicate one or more TPR values for one or both of the base layer or enhancement layer.

According to a first set of examples of the disclosure, a method for wireless communication is described, the method including determining a first TPR for a base layer for a non-orthogonal channel and a second TPR for an enhancement layer for the non-orthogonal channel; receiving at least a portion of a reference signal of the non-orthogonal channel; and estimating channel quality for the base layer or the enhancement layer based at least in part on an energy level of the received reference signal and one or more of the first TPR or the second TPR.

According to the first set of examples, an apparatus for wireless communications is described, the apparatus including means for determining a first TPR for a base layer for a non-orthogonal channel and a second TPR for an enhancement layer for the non-orthogonal channel; means for receiving at least a portion of a reference signal of the non-orthogonal channel; and means for estimating channel quality for the base layer or the enhancement layer based at least in part on an energy level of the received reference signal and one or more of the first TPR or the second TPR.

According to the first set of examples, another apparatus for wireless communication is described, the apparatus including a processor, and a memory in electronic communication with the processor and instructions stored in the memory, the instructions being executable by the processor to: determine a first TPR for a base layer for a non-orthogonal channel and a second TPR for an enhancement layer for the non-orthogonal channel; receive at least a portion of a reference signal of the non-orthogonal channel; and estimate channel quality for the base layer or the enhancement layer based at least in part on an energy level of the received reference signal and one or more of the first TPR or the second TPR.

According to the first set of examples, a non-transitory computer-readable medium storing code for wireless communication is described, the code comprising instructions executable by a processor to: determine a first TPR for a base layer for a non-orthogonal channel and a second TPR for an enhancement layer for the non-orthogonal channel; receive at least a portion of a reference signal of the non-orthogonal channel; and estimate channel quality for the base layer or the enhancement layer based at least in part on an energy level of the received reference signal and one or more of the first TPR or the second TPR.

In some aspects of the method, apparatuses, and/or non-transitory computer-readable medium of the first set of examples, a determination may be made of which of one or more transmission strategy categories is to be used for downlink transmissions from a base station to the UE over the non-orthogonal channel; and the first TPR and the second TPR may be selected from at least one pair of first TPR and second TPR values, each pair associated with one of the transmission strategy categories. In some examples, signaling may be received from the base station that provides the one or more pairs of first TPR and second TPR values and the transmission strategy category associated with each of the pairs of TPR values. The signaling may be received, for example, via radio resource control (RRC) signaling. In some examples, the determining which of the one or more transmission strategy categories is based at least in part on spatial layer sharing of respective transmission strategies, and a first pair of TPR values is associated with transmission strategies that use spatial layer sharing and a second pair of TPR values is associated with transmission strategies that do not use spatial layer sharing. In certain examples, the reference signal is one or more of a cell-specific reference signal (C-RS) or a channel state information reference signal (CSI-RS).

In some aspects of the method, apparatuses, and/or non-transitory computer-readable medium of the first set of examples, the first TPR and the second TPR are determined based at least in part on information contained in a physical downlink control channel (PDCCH), and wherein the information contained in the PDCCH comprises one or more of precoding matrix information, spatial layer sharing information, TPR information, or interference cancellation information. In some examples, the interference cancellation information may include an interference cancellation flag, and a first pair of TPR values are to be used for the first TPR and the second TPR when the flag is set, and a second pair of TPR values are to be used for the first TPR and the second TPR when the flag is cleared. In some examples, two or more pairs of TPR values may be provided to the UE via RRC signaling, each pair of TPR values including an associated first TPR value and second TPR value. The TPR information may include, for example, an indication of which pair of TPR values are to be selected for the first TPR and the second TPR.

In some aspects of the method, apparatuses, and/or non-transitory computer-readable medium of the first set of examples, a demodulation reference signal (DM-RS) of a data transmission over the non-orthogonal channel may be received, and the data transmission may be demodulated based at least in part on a TPR value for the received DM-RS. In some examples, the TPR value for the received DM-RS is a sum of the first TPR and the second TPR. In certain examples, the TPR value for the received DM-RS is independent of one or more of the first TPR or the second TPR and may, for example, be a unity ratio. The DM-RS, in some examples, may be associated with one of a plurality of antenna ports of the non-orthogonal channel, and the one of the plurality of antenna ports may be selected for estimating the channel quality based on whether the UE is to receive base layer transmissions or enhancement layer transmissions. In certain examples, a transmit power for data transmissions for the base layer transmissions or enhancement layer transmissions corresponds to the DM-RS power of the respective base layer or enhancement layer.

According to a second set of illustrative examples, a method for wireless communication is described. In one example the method may include determining a first TPR between a base layer data transmission and a reference signal transmission and a second TPR between an enhancement layer data transmission and the reference signal transmission; and transmitting signaling to one or more user equipment (UE) indicating the first TPR and second TPR.

According to the second set of examples, an apparatus for wireless communications is described, the apparatus including means for determining a first TPR between a base layer data transmission and a reference signal transmission and a second TPR between an enhancement layer data transmission and the reference signal transmission; and means for transmitting signaling to one or more UE indicating the first TPR and second TPR.

According to the second set of examples, another apparatus for wireless communication is described, the apparatus including a processor, and a memory in electronic communication with the processor and instructions stored in the memory, the instructions being executable by the processor to: determine a first TPR between a base layer data transmission and a reference signal transmission and a second TPR between an enhancement layer data transmission and the reference signal transmission; and transmit signaling to one or more UE indicating the first TPR and second TPR.

According to the second set of examples, a non-transitory computer-readable medium storing code for wireless communication is described, the code comprising instructions executable by a processor to: determine a first TPR between a base layer data transmission and a reference signal transmission and a second TPR between an enhancement layer data transmission and the reference signal transmission; and transmit signaling to one or more UE indicating the first TPR and second TPR.

In some aspects of the method, apparatuses, and/or non-transitory computer-readable medium of the second set of examples, the determination of the first TPR and the second TPR may include determining one or more transmission strategy categories for transmissions between the base station and a UE; determining one or more pair of TPR values for each transmission strategy category, each pair of TPR values comprising an associated first TPR value for base layer data transmissions and an associated second TPR value for enhancement layer data transmissions; and transmitting one or more reference signals according to the determined pair of TPR values. In some examples, signaling may be transmitted that provides the pairs of TPR values and the transmission strategy category associated with each pair of TPR values. Such signaling may be transmitted, for example, via RRC signaling. In some examples, the transmission strategy category may be determined based on spatial layer sharing of a transmission strategy, and a first pair of TPR values is associated with transmission strategies that use spatial layer sharing and a second pair of TPR values is associated with transmission strategies that do not use spatial layer sharing.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1A:
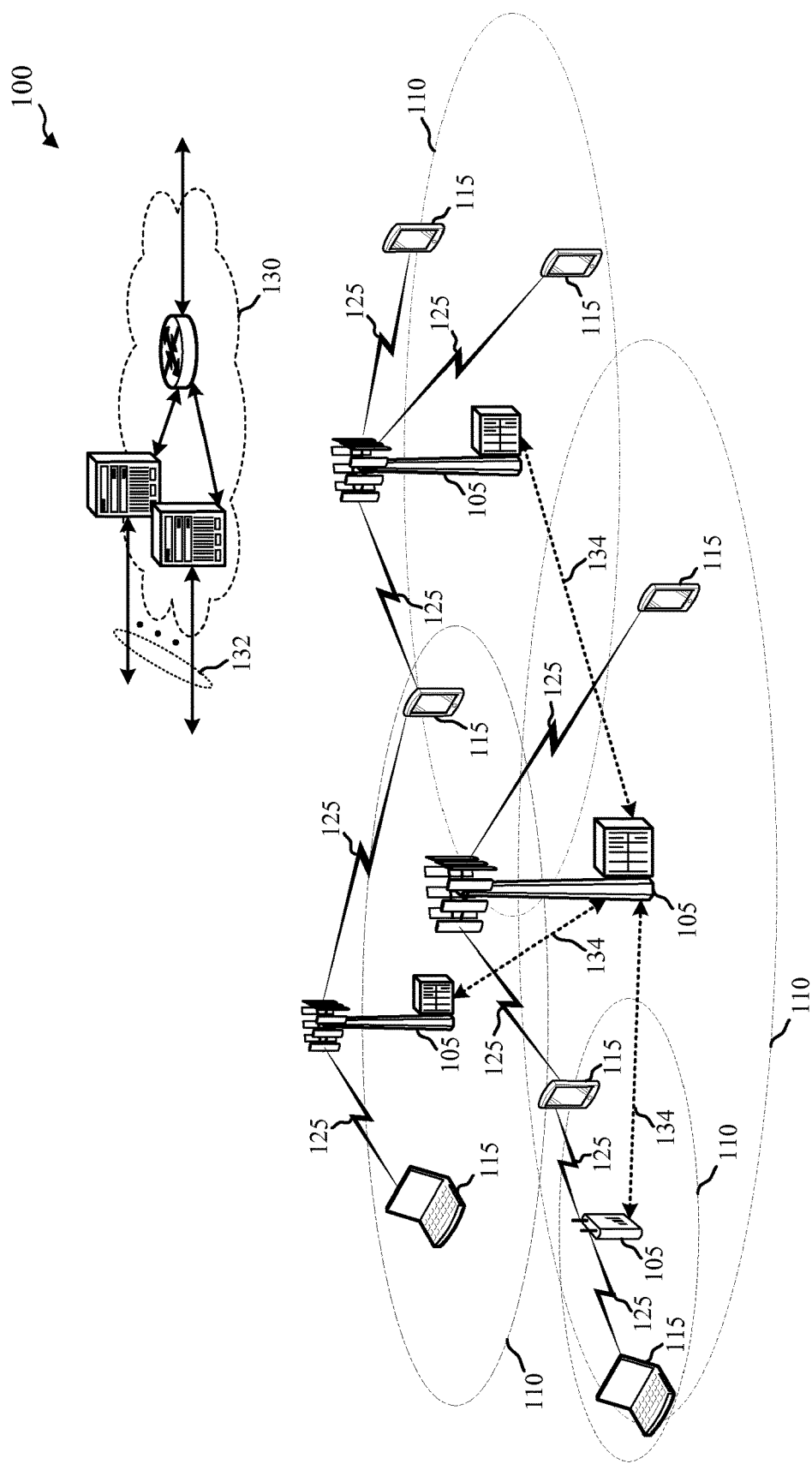
FIG. 1A illustrates an example of a wireless communications system, in accordance with various aspects of the disclosure.

Techniques are described for reference signal transmissions and transmit power ratio determination in non-orthogonal transmissions. In some examples, a base station (e.g., a base station including an enhanced Node B (eNB)) and/or a UE may be configured to transmit and/or receive non-orthogonal transmissions within a wireless communication system. For example, the eNB and UE may transmit and/or receive data streams via a base layer of a signal as well as via an enhancement layer that is modulated on the signal along with the base layer. Thus, concurrent, non-orthogonal, data streams may be provided to the same or different UEs, and each modulation layer may be used to transmit content that may be selected based on particular deployments and/or channel conditions. Such concurrent, non-orthogonal data streams may be referred to as non-orthogonal multiple access (NOMA) transmissions, and in the case of downlink transmissions, NOMA transmissions may be referred to as NOMA downlink transmissions. Various interference mitigation techniques may be implemented to compensate for interfering signals received from within a cell.

In some examples, NOMA downlink transmissions may be provided to one or more UEs from a base station through hierarchical and/or superposition modulation, in which a first data stream may be modulated for transmission on a base layer of a signal and a second data stream may be modulated for transmission on an enhancement layer of the signal. For example, the enhancement layer may be superpositioned on the base layer of the signal and the signal may be transmitted to the one or more UEs. Additionally or alternatively, the modulation of the first data stream onto the base layer and the second data stream onto the enhancement layer may be hierarchical, in which a symbol constellation of the transmitted signal includes sub-constellations associated with the base layer and enhancement layer. In some examples, a UE may transmit multiple hierarchical and/or superposition modulation layers to a base station in a similar manner.

For a UE to which the first data stream is directed, the enhancement layer may be seen as interference. However, the signal-to-noise ratio (SNR) of the base layer may be at a level that allows successful demodulation and decoding of the first data stream from the base layer even in the presence of interference from the enhancement layer. A UE to which the second data stream is directed may demodulate and/or decode symbols and/or data received on the base layer, and then perform interference cancellation to cancel the signal of the base layer. The UE may then demodulate and decode the second data stream from the remaining signal after interference cancellation. When multiple layers in NOMA downlink transmissions share some or all of the same resources (e.g., have partially or fully overlapping resource blocks), a UE may perform an interference cancellation operation on one or more of the layers of the NOMA downlink transmissions, to identify and decode data streams on other layers that are intended for the UE.

To perform an interference cancellation operation on NOMA downlink transmissions, a UE may need to estimate channel conditions for the wireless transmission channel used for the downlink transmissions. Such channel conditions may be estimated based at least in part on one or more reference signals transmitted by a base station. In some examples, a traffic-to-pilot power ratio (TPR) may be determined for a base layer for a non-orthogonal channel and another TPR may be determined for an enhancement layer for the non-orthogonal channel. Reference signal transmissions may be transmitted by a base station at a reference signal transmission power, and the UE may estimate channel quality for the base layer or the enhancement layer based at least in part on an energy level of the received reference signal and one or more of the first TPR or the second TPR. Interference cancelation may be performed on the received signals in order to cancel out interference from other modulation layers.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1A shows a block diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul links 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, or some other suitable terminology. The coverage area 110 for a base station 105 may be divided into sectors making up just a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network). In LTE/LTE-A communication systems, the term evolved NodeB or eNB may be, for example, used to describe ones or groups of the base stations 105. In some examples, the wireless communication system 100 may include an LTE/LTE-A communication system that supports hierarchical and/or superposition modulation and interference cancellation, such as an LTE/LTE-A communication system that supports the transmission of a set of NOMA downlink transmissions. In some examples, the wireless communication system 100 may support wireless communication using one or more access technologies different from LTE/LTE-A.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul link 132 (e.g., S1 application protocol, etc.). The base stations 105 may also communicate with one another, e.g., directly or indirectly via backhaul links 134 (e.g., x2 application protocol, etc.) and/or via backhaul links 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

The communication links 125 shown in wireless communication system 100 may include uplink channels (using component carriers) for carrying uplink (UL) communications (e.g., transmissions from a UE 115 to a base station 105) and/or downlink channels (using component carriers)

for carrying downlink (DL) communications (e.g., transmissions from a base station 105 to a UE 115). The UL communications or transmissions may also be called reverse link communications or transmissions, while the DL communications or transmissions may also be called forward link communications or transmissions. In some examples, one or more downlink channels may carry NOMA downlink transmissions.

In embodiments, the components of wireless communication system 100 including the eNBs 105 and/or UEs 115 are configured for feedback and decoding of non-orthogonal channels including transmit power ratio determination for multiple modulation layers of non-orthogonal transmissions. As used herein, "non-orthogonal channels" includes channels of a carrier between a multiple-antenna transmitter and a multiple-antenna receiver for possible transmission layers including both orthogonal and non-orthogonal layers. For example, non-orthogonal channels for a carrier may include channels for transmission techniques such as SU-MIMO, MU-MIMO, and/or NOMA.

Figure 2:
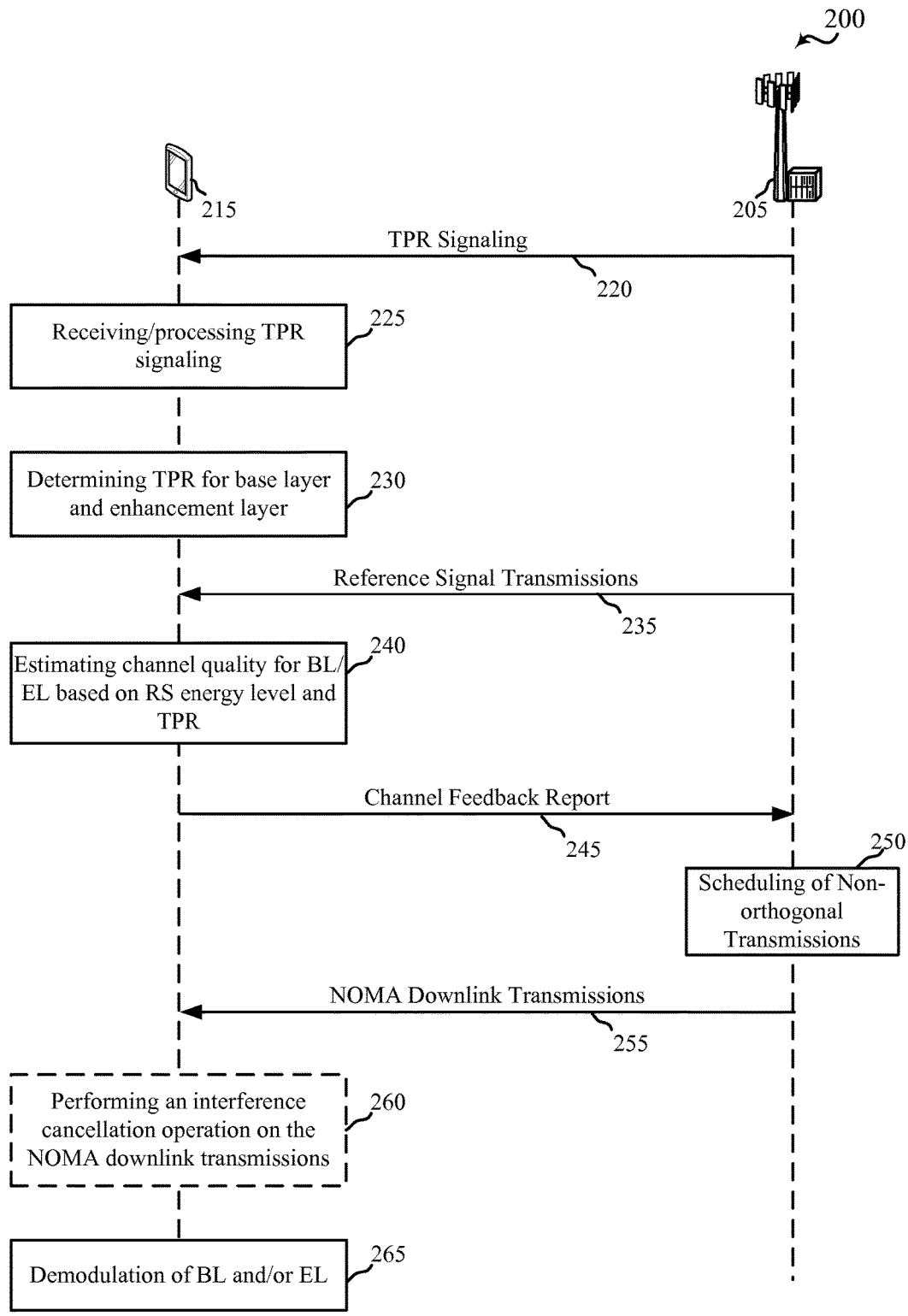
FIG. 2 shows a message flow between a base station and a UE, in accordance with various aspects of the present disclosure.

In some examples, channel feedback for a non-orthogonal channel may be estimated based at least in part on one or more reference signals transmitted by a base station and one or more TPR pairs associated with potential TSs for transmissions over the non-orthogonal channel. For example, a first TPR may be determined for a base layer for a non-orthogonal channel and a second TPR may be determined for an enhancement layer for the non-orthogonal channel. Reference signal transmissions may be transmitted by a base station at a reference signal transmission power, and a UE may estimate channel quality for the base layer or the enhancement layer based at least in part on an energy level of the received reference signal and one or more of the first TPR or the second TPR. A base station may, in certain examples, transmit TPR signaling that may indicate one or more TPR values for one or both of the base layer or enhancement layer. FIG. 2 provides an example of how a TPR determination may be used to facilitate channel estimation by a UE.

Figure 1B:
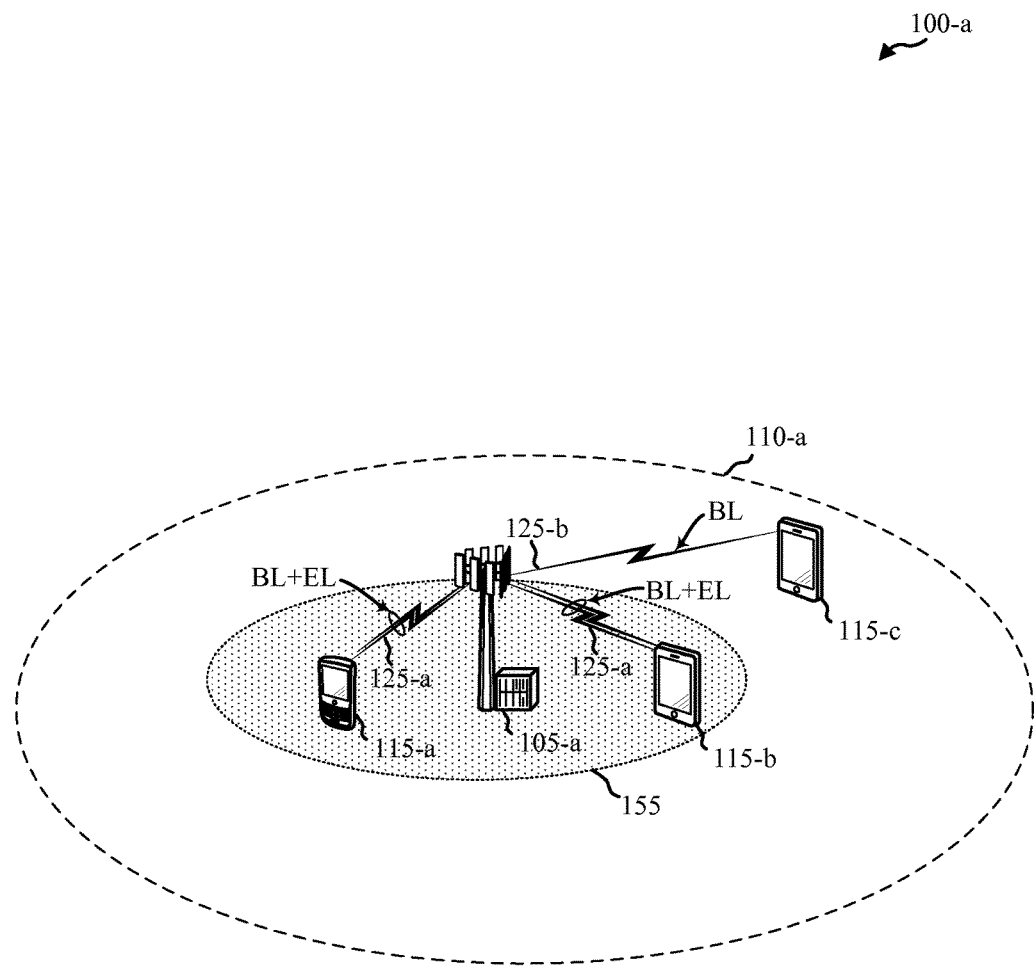
FIG. 1B illustrates a hierarchical modulation environment in accordance with various aspects of the present disclosure.

As mentioned above, various aspects of the present disclosure are directed to transmissions on multiple hierarchical and/or superposition modulation layers. FIG. 1B illustrates a system 100-a in which a base station 105-a may communicate with one or more UEs 115 using hierarchical modulation. System 100-a may illustrate, for example, aspects of wireless communication system 100 illustrated in FIG. 1A. In the example of FIG. 1B, a base station 105-a may communicate with a number of UEs 115-a, 115-b, and 115-c within a coverage area 110-a of the base station 105-a. In this example, multiple modulation layers may be employed for wireless communications, which may include a base layer and one or more enhancement layers concurrently transmitted between the base station 105-a and the UEs 115. The base layer, according to some examples, may provide transmissions having relatively high reliability communications between the base station 105-a and UEs 115, resulting in a higher likelihood that the UEs 115 within the coverage area 110-a will be able to decode content transmitted on the base modulation layer. The enhancement layer, according to various examples, may provide relatively lower reliability communications between the base station 105-a and UEs 115 as compared to the base layer. As such, transmissions on the enhancement layer, in order to have reliable reception and decoding, may be provided to UEs 115 having relatively good channel conditions.

As mentioned, the enhancement layer may have a lower likelihood of successful reception relative to the base layer, with the likelihood of successful reception largely dependent upon channel conditions between the base station 105-a and UEs 115. In some deployments, such as illustrated in FIG. 1B, UEs 115-a and 115-b may be located relatively close to base station 105-a in area 155, while UE 115-c may be located closer to a cell edge of the base station 105-a coverage area 110-a. If it is determined that UEs 115-a and 115-b located in area 155 have channel conditions conducive for hierarchical and/or superposition modulation, base station 105-a may signal to the UEs 115-a and 115-b that such communications may be employed. In such cases, communication links 125-a may include both a base layer and an enhancement layer, and UEs 115-a and 115-b may support communications on each of the modulation layers. In this example, UE 115-c, located closer to the cell edge of coverage area 110-a, and outside of area 155, may be signaled to communicate using only the base layer in communications link 125-b. While the communications link 125-b may still be transmitted with both the base and enhancement layers, UE 115-c may not attempt to decode the enhancement layer due to the relatively low likelihood of successful reception and decoding of content modulated on the enhancement layer. In other examples, one or more of the UEs 115 may not have the capability to receive and decode enhancement layer transmissions, in which case the base layer is simply received and decoded according to established techniques.

FIG. 2 shows a message flow 200 between a base station 205 and a UE 215, in accordance with various aspects of the present disclosure. In some examples, the base station 205 may be an example of aspects of one or more of the base stations 105 described with reference to FIG. 1A or FIG. 1B. In some examples, the UE 215 may be an example of aspects of one or more of the UEs 115 described with reference to FIG. 1A or FIG. 1B. Messages may be transmitted between the base station 205 and the UE 215 over at least one radio frequency spectrum band.

As shown in FIG. 2, the base station 205 may transmit TPR signaling 220 to the UE 215. The TPR signaling may indicate a TPR for base layer transmissions, enhancement layer transmissions, or both. In legacy systems, a common (or cell-specific) reference signal (CRS) or channel state information reference signal (CSI-RS) may be used for channel quality information estimation, with TPR signaled through radio resource control (RRC) signaling. TPR changes in such systems may be relatively slow, and such signaling would provide information on TPR for a sole legacy modulation layer. According to various aspects of the present disclosure, multiple hierarchical and/or superposition modulation layers may be provided, as mentioned above. The total power transmitted by a base station for NOMA downlink transmissions is split between base layer transmissions and enhancement layer transmissions, and thus the TPR signaled through legacy RRC signaling may not be sufficient to indicate TPR for all of the hierarchical and/or superposition modulation layers.

According to various aspects of the disclosure, TPR information for the base layer and enhancement layer may be included in the TPR signaling 220. In some examples, the TPR signaling 220 may be transmitted using RRC signaling to signal TPR for the base layer and enhancement layer, respectively. The TPR for each modulation layer may be indicated as a ratio with respect to, for example, CRS or CSI-RS transmissions. In some examples, the total of the TPRs for each modulation layer does not need to be 0 dB. For example, the TPR may be −2.0 dB for base layer transmissions, and −3.0 dB for enhancement layer transmissions, according to one transmit strategy (TS), and may be other values for different TSs.

In some examples, TPR pairs may be signaled for one or more different TSs. In certain examples, due to the number of available TSs, rather than provide signaling for each TS, the TPR signaling 220 may include one or more TPR pairs that apply to different categories of TS. For example, a first TPR pair may include a base layer TPR and an enhancement layer TPR for TSs with spatial layer sharing, and a second TPR pair may include different base and enhancement layer TPRs for TSs without spatial layer sharing. In one example, a base layer may be transmitted using a transmit power of 80% of the total power, and an associated enhancement layer may be transmitted using a transmit power of 20% of the total power (i.e., a TPR pair of 0.8, 0.2) for TSs with spatial layer sharing, and a different TPR pair of 0.5, 0.5 may be used for TSs without spatial layer sharing. Of course, numerous different TPR pairs may be utilized as will be readily apparent to one of skill in the art. In some examples, a default pair of TPRs may be provided for two or more different TSs. In other examples, multiple TPR pairs may be provided for each TS category, and a UE receiving reference signals may provide channel information feedback reports for each different TPR pair for each TS.

With continued reference to FIG. 2, the UE 215 may perform receiving and processing of the TPR signaling 220, as indicated at block 225. The UE 215 may then determine the TPR for each of the base layer and enhancement layer transmissions, as indicated at block 230. The base station 205 may transmit reference signal transmissions 235 (e.g., CRS or CSI-RS). At the UE 215, the determined TPR for the base and enhancement layers may be used in SNR prediction and for generating a channel quality indicator (CQI) for transmissions using the base layer and/or enhancement layer over the non-orthogonal channel, as indicated at block 240. The UE 215 may transmit a channel feedback report 245, which may include all or part of the CQI, to the base station 205. The base station 205 may perform scheduling of NOMA transmissions based at least in part on the channel feedback report 245 from the UE 215, as indicated at block 250. In some examples, the base station 205 may schedule groups of multiple UEs to receive transmissions on one or more of the base layer and enhancement layer, with UEs within a group all sharing the same TPR pair in order to avoid a SNR mismatch among UEs and potential performance loss.

At some point in time following scheduling of NOMA transmissions 250 (and in some examples, immediately following), the base station 205 may transmit NOMA downlink transmissions 255. The NOMA downlink transmissions 255 may be received by the UE 215 (and possibly other UEs in a NOMA group). In some cases, NOMA downlink transmission 255 may include a DM-RS, which may be used by the UE 215 to support the demodulation of the base layer and/or enhancement layer.

At block 260 the UE 215 may perform an interference cancellation operation (e.g., a codeword-level interference cancellation (CWIC) operation, a symbol-level interference cancellation (SLIC) operation, etc.) on the interfering transmission (e.g., base layer). The interference cancellation operation may be performed on an interfering transmission based at least in part on CQI information for the base layer and enhancement layer and/or DM-RS of the transmission. In some examples, the interference cancellation operation may include decoding (e.g., CRC-descrambling) an interfering transmission (e.g., a hierarchical and/or superposition modulation layer) corresponding to communications for a different UE (not shown) or corresponding to one of multiple hierarchical and/or superposition modulation layers for the UE 215. For example, the UE 215 may be scheduled to receive enhancement layer transmissions only, or may be scheduled to receive both base layer and enhancement layer transmissions, and may perform interference cancelation on the base layer to identify and decode the data stream modulated on the enhancement layer of the received signal.

At block 265, the UE 215 may perform the demodulation of the base layer and/or the enhancement layer based on the DM-RS of the data transmission received over the non-orthogonal channel and the determined TPR for the base and enhancement layers. For example, the UE 215 may receive the DM-RS of the data transmission over the non-orthogonal channel and determine signal reference values (e.g., phase, amplitude, etc.) for demodulation of the data transmission based on the TPR values. Blocks 265 and 260 may be performed iteratively (e.g., demodulation of base layer prior to interference cancellation of base layer and demodulation of enhancement layer from the signal after interference cancellation, etc.).

Figure 3:
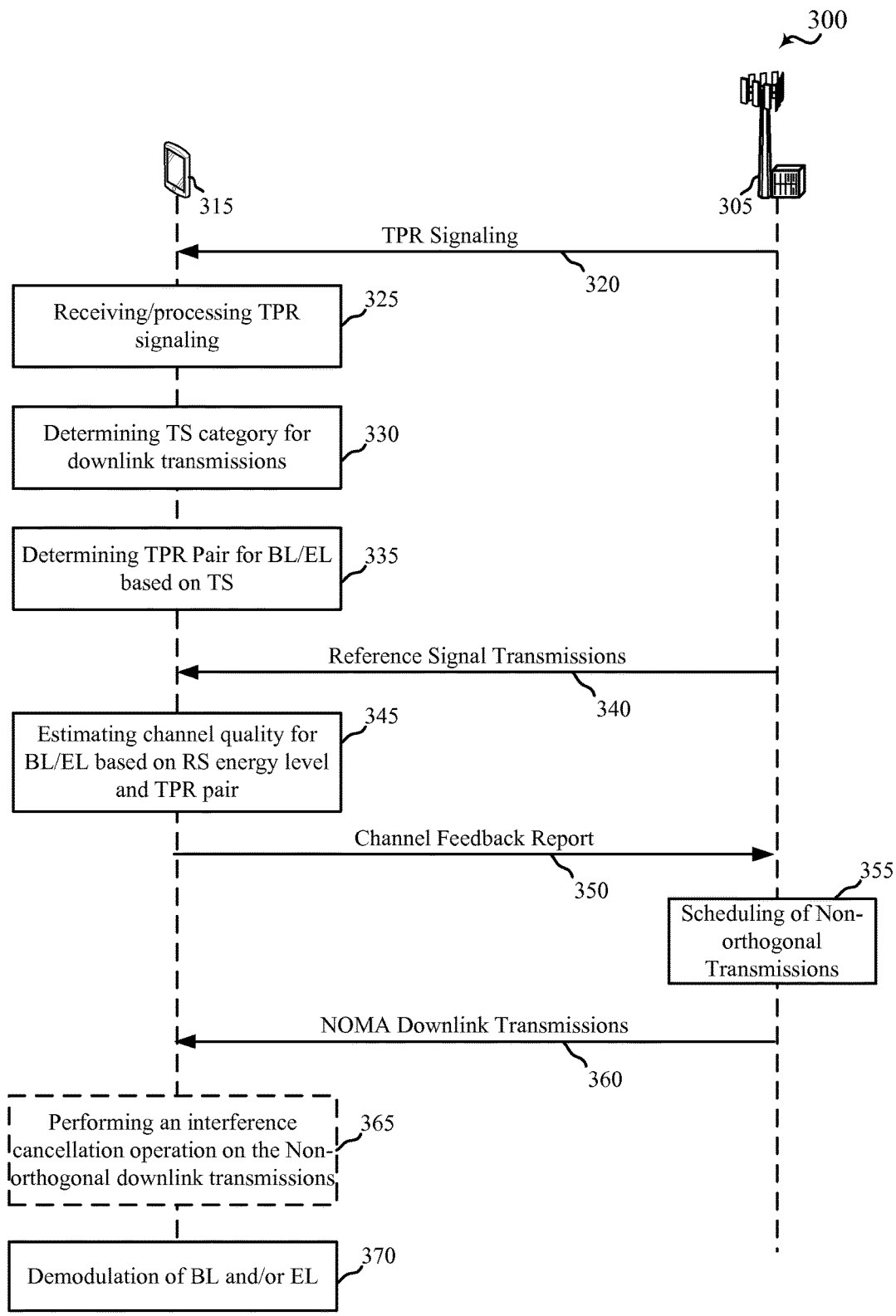
FIG. 3 shows another message flow between a base station and a UE, in accordance with various aspects of the present disclosure.

FIG. 3 shows a message flow 300 between a base station 305 and a UE 315 in accordance with various aspects of the present disclosure. In some examples, the base station 305 may be an example of aspects of one or more of the base stations 105 described with reference to FIG. 1A or FIG. 1B. In some examples, the UE 315 may be an example of aspects of one or more of the UEs 115 described with reference to FIG. 1A or FIG. 1B. In some examples, the UE 315, and in some examples other UEs (not shown), may receive NOMA communications (e.g., communications on one or more of a base layer or enhancement layer). Messages may be transmitted between the base station 305 and the UE 315 over at least one radio frequency spectrum band.

As shown in FIG. 3, the base station 305 may transmit TPR signaling 320 to the UE 315. The TPR signaling may indicate a TPR for base layer transmissions, enhancement layer transmissions, or both. In some examples, the TPR signaling 320 may be transmitted using RRC signaling to signal TPR for the base layer and enhancement layer, respectively. In some examples, the TPR signaling 320 may include one or more pairs of TPRs, with one value of the TPR pair corresponding to a base layer TPR and a second value of the TPR pair corresponding to an enhancement layer TPR. The TPR for each modulation layer may be indicated as a ratio with respect to, for example, CRS or CSI-RS transmissions. The UE 315 may perform receiving and processing of the TPR signaling 320, as indicated at block 325. The UE 315 may then determine the TS category for downlink transmissions, as indicated at block 330.

At block 335, the UE 315 may determine a TPR pair for base layer and enhancement layer transmissions based on the determined TS category. In some examples, TPR pairs may be signaled in the TPR signaling 320 for one or more different categories of TSs. For example, a first TPR pair may include a base layer TPR and an enhancement layer TPR for TSs with spatial layer sharing, and a second TPR pair may include different base and enhancement layer TPRs for TSs without spatial layer sharing. The UE 315 may determine the TS category, in some examples, based on information that may be included in downlink control information (DCI) that may be received on a physical downlink control channel (PDCCH). In some examples, UE 315 may determine a precoding matrix indicator (PMI) and information on spatial layer usage from the DCI received on the PDCCH. In certain examples, one or more PDCCH transmissions may include a TPR field. Such a TPR field may allow one or more TPR values to change, and may allow base station 305 to overwrite a TPR that may have been provided in, for example, RRC signaling in the TPR signaling 320. In some situations, two or more TSs may exist that have the same spatial layer usage.

The TPR for such different TSs may be set to be the same value, to avoid ambiguity in what TPR values are to be used by a UE 315, according to certain examples. In other examples, different TSs that have the same spatial layer usage may have different TPR values based on whether data interference cancellation is used for the associated transmissions. In such examples, the TPR for use by UE 315 may be resolved based on an interference cancellation flag that may be included in the PDCCH transmissions. For example, an interference cancellation flag that is set to a value of one may indicate data interference cancellation is to be used and may imply a first TPR pair, and an interference cancellation flag that is cleared to a value of zero may indicate that data interference cancellation is not used and may imply a second TPR pair. Then given the PDCCH transmissions, the TPR is known after the UE determines which TS is being used, and channel and interference statistics may be properly constructed.

With continued reference to FIG. 3, the base station 305 may transmit reference signal transmissions 340 (e.g., CRS or CSI-RS). At the UE 315, the determined TPR pair may be used in SNR prediction and for estimating channel quality for one or more of the base layer and enhancement layer based on an energy level of the received reference signal and the determined TPR pair, as indicated at block 345. The UE 315 may transmit a channel feedback report 350, which may include all or part of the estimated channel quality (e.g., in a CQI report, etc.), to the base station 305.

The base station 305 may perform scheduling of non-orthogonal transmissions based at least in part on the channel feedback report 350 from the UE 315, as indicated at block 355. For example, the base station 305 may schedule groups of multiple UEs to receive data streams via one or more base layers and/or enhancement layers of data transmissions, with UEs within a group all sharing the same TPR pair in order to avoid an SNR mismatch among UEs, which may result in performance loss. The base station 305 may then transmit non-orthogonal downlink transmissions 360. The non-orthogonal downlink transmissions 360 may be received by the UE 315 (and possibly other UEs in a group). The non-orthogonal downlink transmission 360 may include a DM-RS, and may be used by the UE 315 for the demodulation of the base layer or the enhancement layer.

At block 365, the UE 315 operations may include performing an interference cancellation operation (e.g., CWIC, SLIC, etc.) on an interfering transmission. The interference cancellation operation may be performed on an interfering transmission based at least in part on CQI information for the base layer and enhancement layer. In some examples, the interference cancellation operation may include decoding (e.g., CRC-descrambling) an interfering transmission (e.g., a hierarchical and/or superposition modulation layer) corresponding to communications for a different UE (not shown) or corresponding to one of multiple hierarchical and/or superposition modulation layers for the UE 315. For example, the UE 315 may be scheduled to receive enhancement layer transmissions only, or may be scheduled to receive both base layer and enhancement layer transmissions, and may perform interference cancelation on the base layer to identify and decode the data stream modulated on the enhancement layer of the received signal.

At block 370, the UE 315 may perform the demodulation of the base layer and/or the enhancement layer based on the received DM-RS included in the non-orthogonal downlink transmission 360 and the determined TPR for the base and enhancement layers. For example, the UE 315 may receive the DM-RS of the data transmission over the non-orthogonal channel and determine reference values (e.g., phase, amplitude, etc.) for demodulation of the data transmission based on the TPR values. Blocks 370 and 365 may be performed iteratively (e.g., demodulation of base layer prior to interference cancellation of base layer and demodulation of enhancement layer from the signal after interference cancellation, etc.).

Figure 4A:
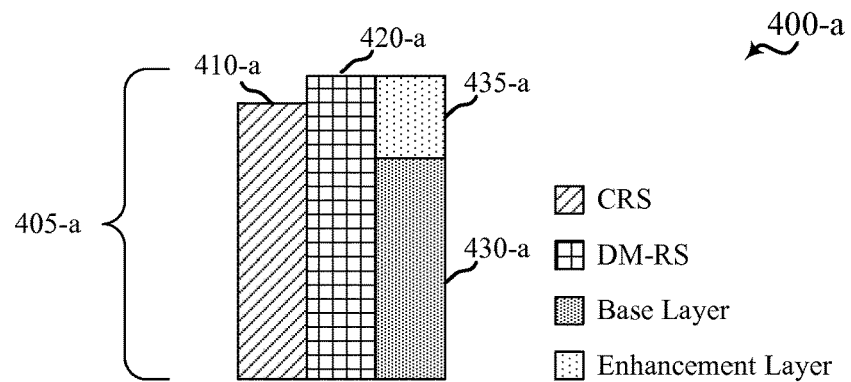
FIGS. 4A-4C show example diagrams of non-orthogonal transmissions, in accordance with various aspects of the present disclosure.
Figure 4B:
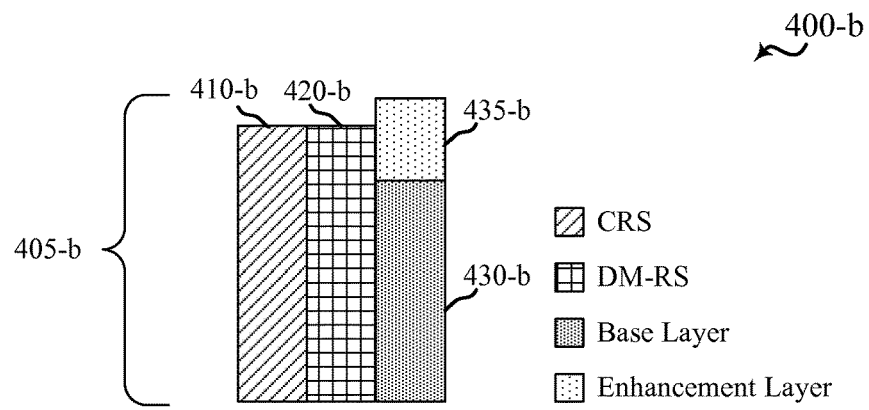
Figure 4C:
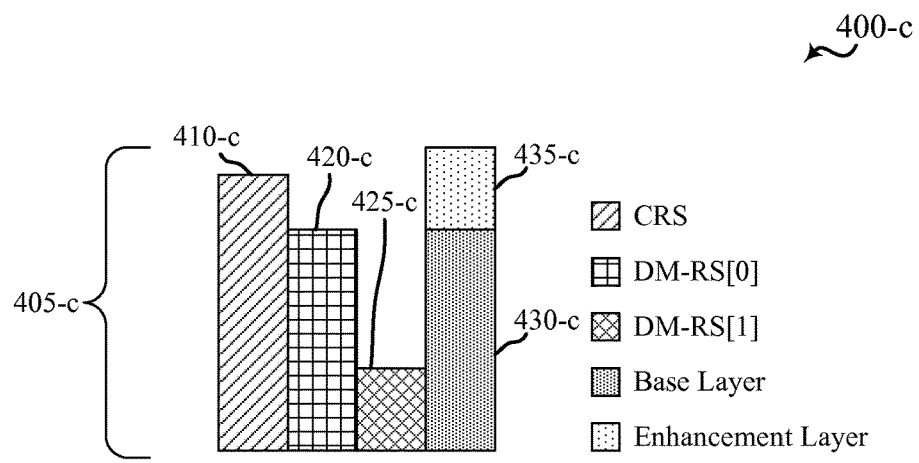

FIGS. 4A-4C show example diagrams of TPR for DM-RS for non-orthogonal transmissions, in accordance with various aspects of the present disclosure. Diagram 400-*a* of FIG. 4A illustrates signaling power levels for a NOMA transmission 405-*a*. The NOMA transmission 405-*a* includes CRS 410-*a*, DM-RS 420-*a*, a base layer 430-*a*, and an enhancement layer 435-*a*. The TPR for DM-RS 420-*a* (e.g., relative to CRS 410-*a*) may be the total of a TPR pair for the base layer 430-*a* and the enhancement layer 435-*a*, according to some examples. For example, if a TPR pair has values of 0.8 and 0.3 for base layer 430-*a* and enhancement layer 435-*a* relative to CRS 410-*a*, the DM-RS 420-*a* TPR may be determined to be the total of the TPR pair, or 1.1. The TPR for data transmissions (e.g., base layer 430-*a* or enhancement layer 435-*a*) may be determined with respect to a transmit power level of CRS 410-*a*. As mentioned above, one or more TPR values provided in TPR signaling may be overwritten by new TPR values in PDCCH transmissions associated with NOMA transmission 405-1. In examples where the DM-RS 420-*b* TPR is the total of the TPR pair for data transmissions, the TPR for DM-RS 420-*b* may be dynamically updated based on the new TPR values.

Diagram 400-*b* of FIG. 4B illustrates signaling power levels for a NOMA transmission 405-*b*. The NOMA transmission 405-*b* includes CRS 410-*b*, DM-RS 420-*b*, a base layer 430-*b*, and an enhancement layer 435-*b*. For NOMA transmission 405-*b*, TPR for DM-RS 420-*b* (e.g., relative to CRS 410-*b*) may be independent of the TPR pair for base layer 430-*b* and enhancement layer 435-*b*. For example, a power level for the DM-RS 420-*b* may be the same as (or a predetermined factor of) the power level for CRS 410-*b*. Thus, if the TPR pair for base layer 430-*b* and enhancement layer 435-*b* transmit powers have values of 0.8 and 0.3 relative to CRS 410-*b*, the DM-RS 420-*b* TPR may be determined to be 1.0 (e.g., to have a unity power ratio with the CRS 410-*b* transmissions). As mentioned above, one or more TPR values provided in TPR signaling may be overwritten by new TPR values in PDCCH transmissions associated with NOMA transmission 405-*b*. In examples where the DM-RS 420-*b* TPR is determined to be unity with the CRS 410-*b* power, the new TPR values may not affect the DM-RS 420-*b* power level relative to the CRS 410-*b* power level.

Diagram 400-*c* of FIG. 4C illustrates signaling power levels for a NOMA transmission 405-*c*. The NOMA transmission 405-*c* includes CRS 410-*c*, a first DM-RS[0] 420-*c* transmitted via a first antenna port, a second DM-RS[1] 425-*c* transmitted via a second antenna port, a base layer 430-*c*, and an enhancement layer 435-*c*. In some cases, the TPR for the first DM-RS[0] 420-*c* (e.g., relative to CRS 410-*c*) may correspond to the TPR of the base layer 430-*c*, and the TPR for the second DM-RS[1] (e.g., relative to CRS 410-*c*) may correspond to the TPR of the enhancement layer 435-*c*. The first and second antenna ports may be selected based on whether a UE is to receive base layer transmissions or enhancement layer transmission, and the TPR for the base layer 430-c or the TPR for the enhancement layer 435-c may correspond to the antenna port based on this selection. In such examples, different UEs, may be included in a group of UEs for NOMA transmissions, and each UE within the group may be provided with its own antenna port for NOMA transmissions with a corresponding DM-RS. For example, one UE may be assigned antenna port 7 and another UE may be assigned antenna port 8. In such cases, a TPR for data resource elements in the NOMA transmission may be the same as the TPR for the corresponding DM-RS[0] 420-c or DM-RS[1] 425-c (e.g., the difference between the DM-RS power level and data resource element power level of the NOMA transmission may be 0 dB), and no TPR field is necessary in PDCCH transmissions, even if the TPR value used for the transmission is different than what was signaled in the TPR signaling, because of the identified antenna port and no other UE potentially sharing a DM-RS transmission.

In some examples, the NOMA transmissions 405 shown in FIGS. 4A-4C may also include other reference signals (e.g., CSI-RS, etc.) which may be transmitted at a normalized power level to CRSs 410.

Figure 5:
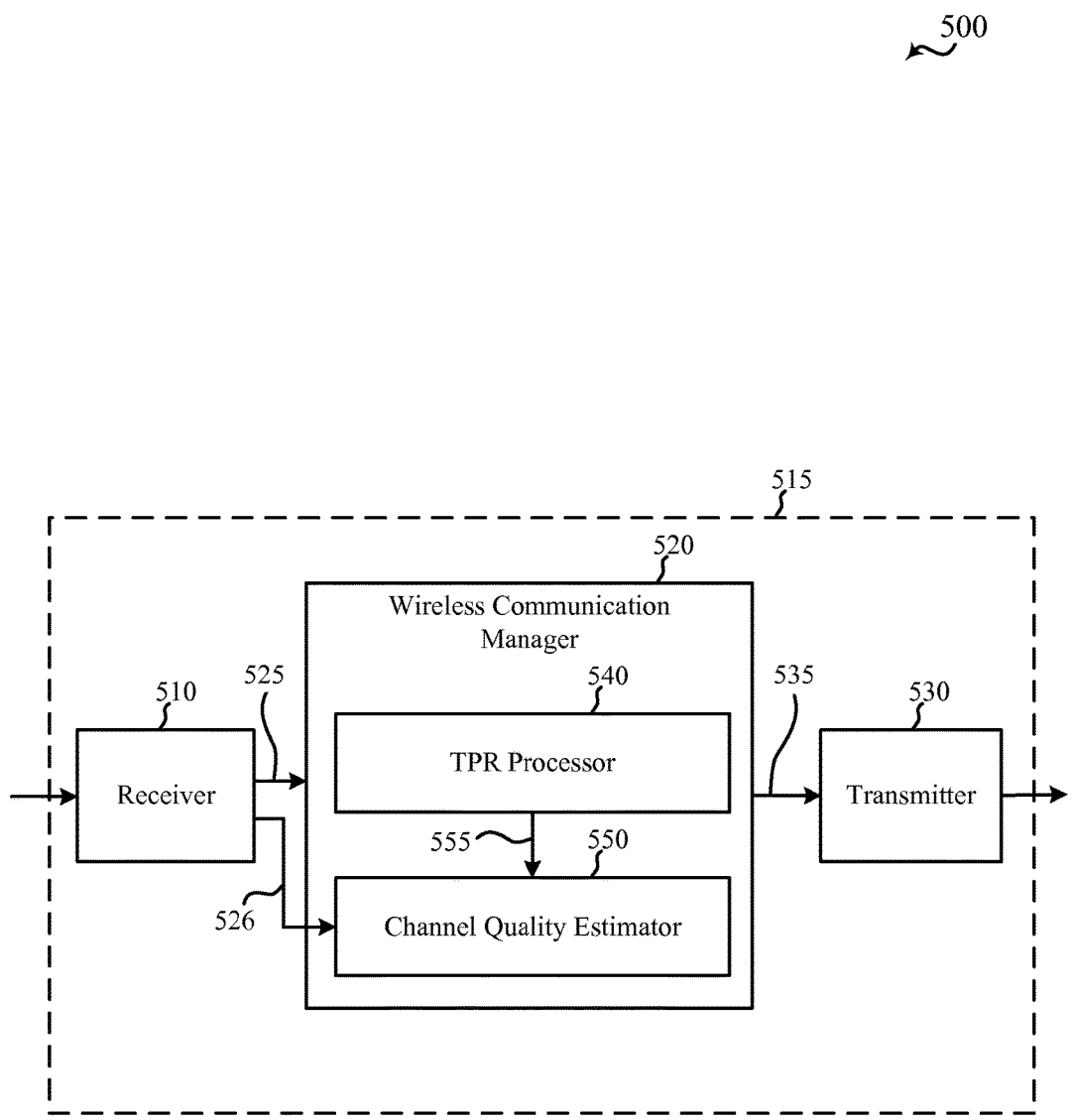
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. In some examples, the apparatus 515 may be an example of aspects of one or more of the UEs 115, 215, or 315 described with reference to FIG. 1A, 1B, 2, 3, or 4A-4C. The apparatus 515 may also be a processor. The apparatus 515 may include a receiver 510, a wireless communication manager 520, and/or a transmitter 530. Each of these components may be in communication with each other.

The components of the apparatus 515 may, individually or collectively, be implemented using one or more Application-Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver 510 may include at least one radio frequency (RF) receiver, such as at least one RF receiver operable to receive transmissions over at least one radio frequency spectrum band. In some examples, the at least one radio frequency spectrum band may be used for wireless communications, as described, for example, with reference to one or more of FIG. 1A, 1B, 2, 3, or 4A-4C. The receiver 510 may be used to receive various types of data and/or control signals (i.e., transmissions) over one or more communication links of a wireless communication system, such as one or more communication links of the wireless communication system 100 described with reference to FIG. 1A or FIG. 1B. For example, the receiver 510 may receive TPR signaling such as discussed above, and provide TPR signaling 525 to wireless communications manager 520. The receiver 510 may also receive one or more reference signal transmissions and one or more data signal transmissions, and provide the transmissions to the wireless communication manager 520.

In some examples, the transmitter 530 may include at least one RF transmitter, such as at least one RF transmitter operable to transmit over at least one radio frequency spectrum band. The transmitter 530 may be used to transmit various types of data and/or control signals (i.e., transmissions) over one or more communication links of a wireless communication system, such as one or more communication links of the wireless communication system 100 described with reference to FIG. 1A or FIG. 1B. For example, the transmitter 530 may receive a channel feedback report 535 from wireless communications manager 520, and may transmit the channel feedback report to a base station.

The wireless communication manager 520 may be used to manage some or all of the wireless communications to and/or from the apparatus 515. In some examples, the wireless communication manager 520 may include a TPR processor 540 and a channel quality estimator 550.

In some examples, the TPR processor 540 may be used to receive TPR signaling information for a UE (e.g., a UE including the apparatus 515). The TPR processor 540, in some examples, may determine a first TPR for a base layer for a non-orthogonal channel and a second TPR for an enhancement layer for the non-orthogonal channel. Such a determination may be based, at least in part, on TPR signaling 525 received from a base station, according to certain examples.

In some examples, the channel quality estimator 550 may be used to estimate, based at least in part on TPR information 555 received from the TPR processor 540, channel quality for inclusion in a channel feedback report that may be provided to a base station. In some examples, the receiver 510 may provide the channel quality estimator 550 with at least a portion of a reference signal 526 of the non-orthogonal channel, and the channel quality estimator 550 may estimate channel quality for the base layer or the enhancement layer based at least in part on an energy level of the received reference signal 526 and the TPR information 555 received from the TPR processor 540.

Figure 6:
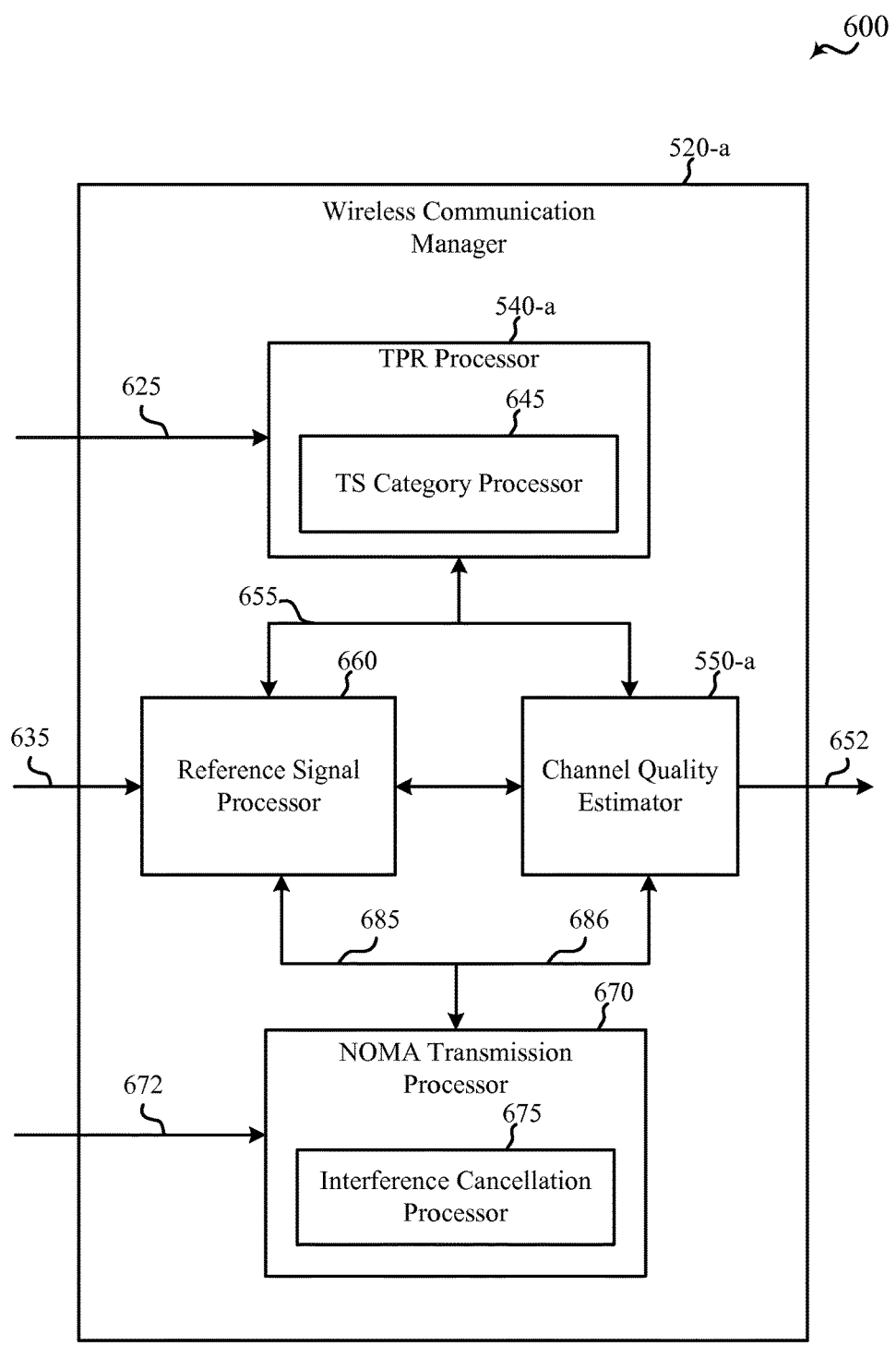
FIG. 6 shows a block diagram of another apparatus for use in wireless communication, in accordance with various aspects of the present disclosure.

FIG. 6 shows a block diagram 600 of a wireless communication manager 520-a for use in wireless communication, in accordance with various aspects of the present disclosure. In some examples, the wireless communication manager 520-a may be an example of aspects of the wireless communication manager 520 of FIG. 5 and may be coupled with a receiver 510 and/or transmitter 530, in some cases. The wireless communication manager 520-a may also be a processor.

The components of the wireless communication manager 520-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The wireless communication manager 520-a may be used to manage some or all of the wireless communications to and/or from one or more of the UEs 115, 215, 315 described with reference to FIG. 1A, 1B, 2, 3 or 4A-4C. In some examples, the wireless communication manager 520-a may include a TPR processor 540-*a*, a channel quality estimator 550-*a*, a reference signal processor 660, and a NOMA transmission processor 670.

In some examples, the TPR processor 540-*a* may be used to receive TPR signaling 625 for a UE (e.g., a UE including the wireless communication manager 520-*a*). The TPR processor 540-*a*, in some examples, may determine a first TPR for a base layer for a non-orthogonal channel and a second TPR for an enhancement layer for the non-orthogonal channel. Such a determination may be based, at least in part, on TPR signaling 625 received from a base station via a receiver, according to certain examples.

In some examples, the TPR processor 540-*a* may include a TS category processor 645 that may determine which of one or more TS categories is to be used for downlink transmissions from a base station to the UE over the non-orthogonal channel. In some examples, the determination of the one or more TS categories may be based at least in part on spatial layer sharing of respective TSs. For example, a first pair of TPR values may be associated with TSs that use spatial layer sharing and a second pair of TPR values may be associated with TSs that do not use spatial layer sharing. Information related to the TS category may be provided to TPR processor 540-*a*, which may select the first TPR and the second TPR from at least one pair of first TPR and second TPR values, each pair associated with one of the TS categories. In some examples, the TPR processor 540-*a* may receive TPR signaling 625 and/or other configuration information, via the receiver, from a base station that provides the one or more pairs of first TPR and second TPR values and the TS category associated with each of the pairs of TPR values. Such signaling may be received, for example, via RRC messaging.

In some examples, the first TPR and the second TPR may be determined based at least in part on information contained in one or more PDCCH transmissions, such as in one or more DCI transmissions, for example. The information contained in the one or more PDCCH transmission may include, according to various examples, one or more of precoding matrix information, spatial layer sharing information, TPR information, or interference cancellation information. In some examples, the interference cancellation information may include an interference cancellation flag, and a first pair of TPR values may be selected for the first TPR and the second TPR when the flag is set, and a second pair of TPR values may be selected for the first TPR and the second TPR when the flag is cleared. In some examples, the TPR processor 540-*a* may be provided with two or more pairs of TPR values via, for example, RRC messaging received at the receiver, and each pair of TPR values may include an associated first TPR value and second TPR value. In further examples, the TPR signaling 625 received at the TPR processor 540-*a* may include an indication of which pair of TPR values are to be selected for the first TPR and the second TPR.

In some examples, the reference signal processor 660 may receive (e.g., via a receiver), one or more reference signals 635. Such reference signals 635 may include CRS, CSI-RS, and/or DM-RS, for example. In some examples, the channel quality estimator 550-*a* may receive TPR information 655 from the TPR processor 540-*a*, where the TPR information 655 may include an indication of the first TPR and second TPR, and estimate channel quality for the base layer or the enhancement layer based on an energy level of the received reference signal 635 and one or more of the first TPR or the second TPR. The channel quality estimation may be included in a channel feedback report 652 that may be transmitted (e.g., via a transmitter) to a base station. In examples in which the reference signals 635 include a DM-RS, the reference signal processor 660 may determine demodulation information 685 (e.g., phase reference, amplitude reference, etc.) for use by NOMA transmission processor 670 in demodulating a data transmission based at least in part on a TPR value for the received DM-RS.

In some cases, the reference signal processor 660 may receive TPR information 655 from the TPR processor 540-*a*, where the TPR information 655 may include an indication of the first TPR and the second TPR. In examples in which the reference signals 635 include a DM-RS, the TPR value for the received DM-RS may be a sum of the first TPR and the second TPR. In other examples, the TPR value for the received DM-RS may be independent of one or more of the first TPR or second TPR, and may be, for example, a unity ratio (e.g., the DM-RS may have the same power level as the CRS or CSI-RS, etc.). In some examples, the DM-RS may be associated with one of a number of available antenna ports, and the antenna port selected for estimating the channel quality may be determined based on whether base layer transmissions or enhancement layer transmissions are to be received. Furthermore, in some examples, a transmit power for data transmissions for the base layer transmissions or enhancement layer transmissions may correspond to the transmit power of the DM-RS of the associated base layer or enhancement layer.

In some examples, the NOMA transmission processor 670 may receive NOMA downlink transmissions 672 via a receiver, and may also receive CQI information 686 from the channel quality estimator 550-*a*. The NOMA transmission processor 670 may include an interference cancellation processor 675, which may perform an interference cancellation operation on the interfering transmission(s) or layers of NOMA downlink transmissions 672 based on the demodulation information 685 and/or CQI information 686 (e.g., CQI information for the base layer, enhancement layer, and/or DM-RS of the transmission). In some examples, the interference cancellation processor 675 may be used to perform an interference cancellation operation on interfering transmission(s) based on an interference cancellation flag that may be set in one or more PDCCH transmissions. In some examples, the interference cancellation operation may include decoding the interfering transmission(s) and then canceling the interfering transmission(s) from the set of NOMA downlink transmissions 672.

Figure 7:
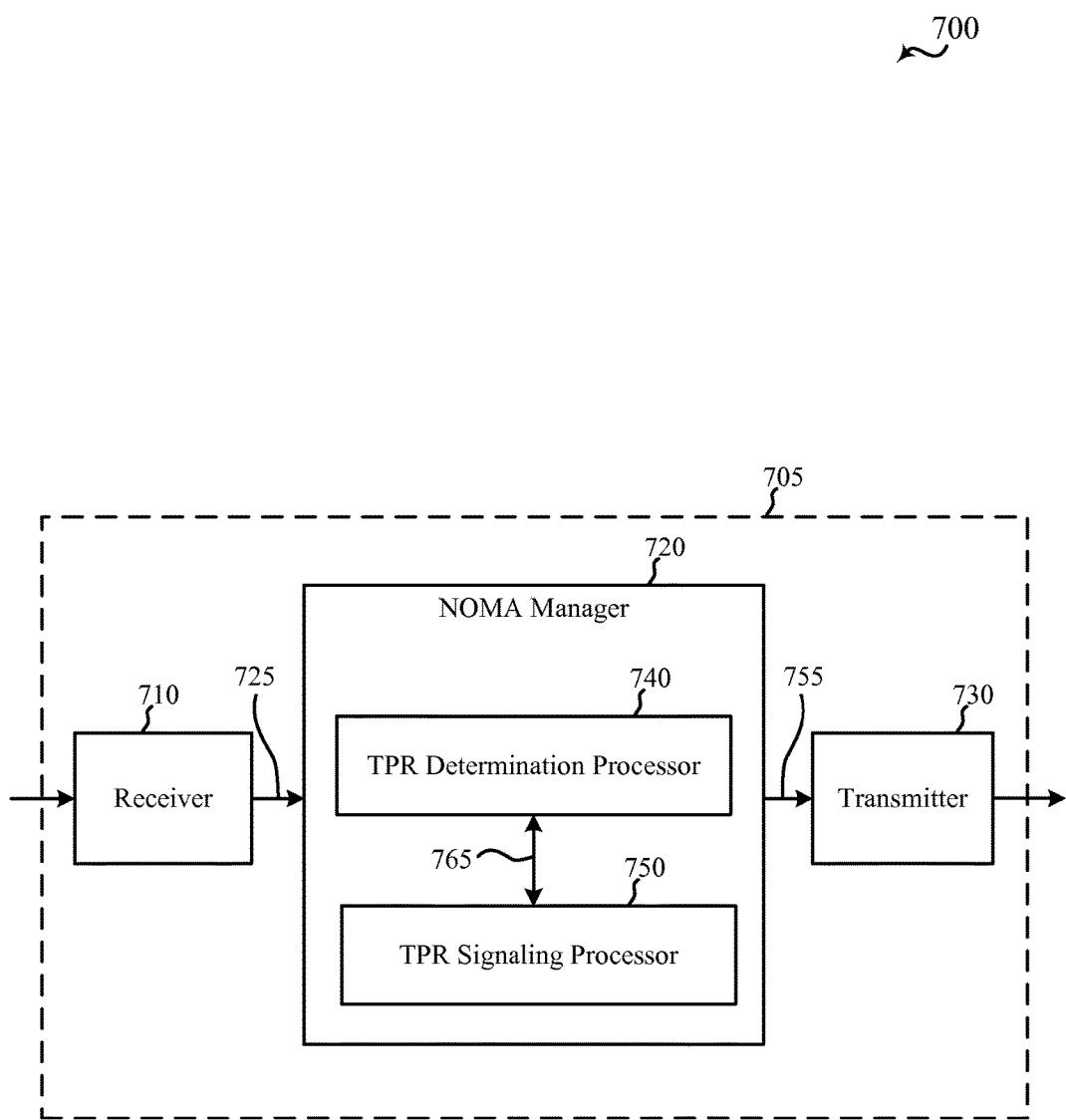
FIG. 7 shows a block diagram of another apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of aspects of one or more of the base stations 105, 205, or 305 described with reference to one or more of FIG. 1A, 1B, 2, 3, or 4A-4C. The apparatus 705 may also be a processor. The apparatus 705 may include a receiver 710, a NOMA manager 720, and/or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over at least one radio frequency spectrum band. In some examples, the at least one radio frequency spectrum band may be used for wireless communications, as described, for example, with reference to one or more of FIG. 1A, 1B, 2, 3, or 4A-4C. The receiver 710 may be used to receive various types of data and/or control signals (i.e., transmissions) over one or more communication links of a wireless communication system, such as one or more communication links of the wireless communication system 100 described with reference to FIG. 1A or FIG. 1B. For example, the receiver 710 may receive data, control, or reference signals from one or more UEs. In some examples, the NOMA manager 720 may receive channel feedback reports 725 from the receiver 710, and the NOMA manager 720 may perform scheduling of NOMA transmissions based at least in part on the channel feedback reports 725.

In some examples, the transmitter 730 may include at least one RF transmitter, such as at least one RF transmitter operable to transmit over at least one radio frequency spectrum band. The transmitter 730 may be used to transmit various types of data and/or control signals (i.e., transmissions) over one or more communication links of a wireless communication system, such as one or more communication links of the wireless communication system 100 described with reference to FIG. 1A or FIG. 1B. For example, the transmitter 730 may transmit data, control, or reference signals to one or more UEs.

The NOMA manager 720 may be used to manage some or all of the non-orthogonal wireless communications to and/or from the apparatus 705. In some examples, the NOMA manager 720 may include a TPR determination processor 740 and a TPR signaling processor 750.

In some examples, the TPR determination processor 740 may be used to determine a first TPR between a base layer data transmission and a reference signal transmission and a second TPR between an enhancement layer data transmission and the reference signal transmission. The TPR determination processor 740 may pass one or more TPR pairs 765 for non-orthogonal transmissions to the TPR signaling processor 750. The TPR signaling processor 750 may be used to transmit TPR signaling 755 (e.g., via the transmitter 730), to one or more UEs indicating one or more TPRs of the TPR pairs 765 determined by the TPR determination processor 740.

Figure 8:
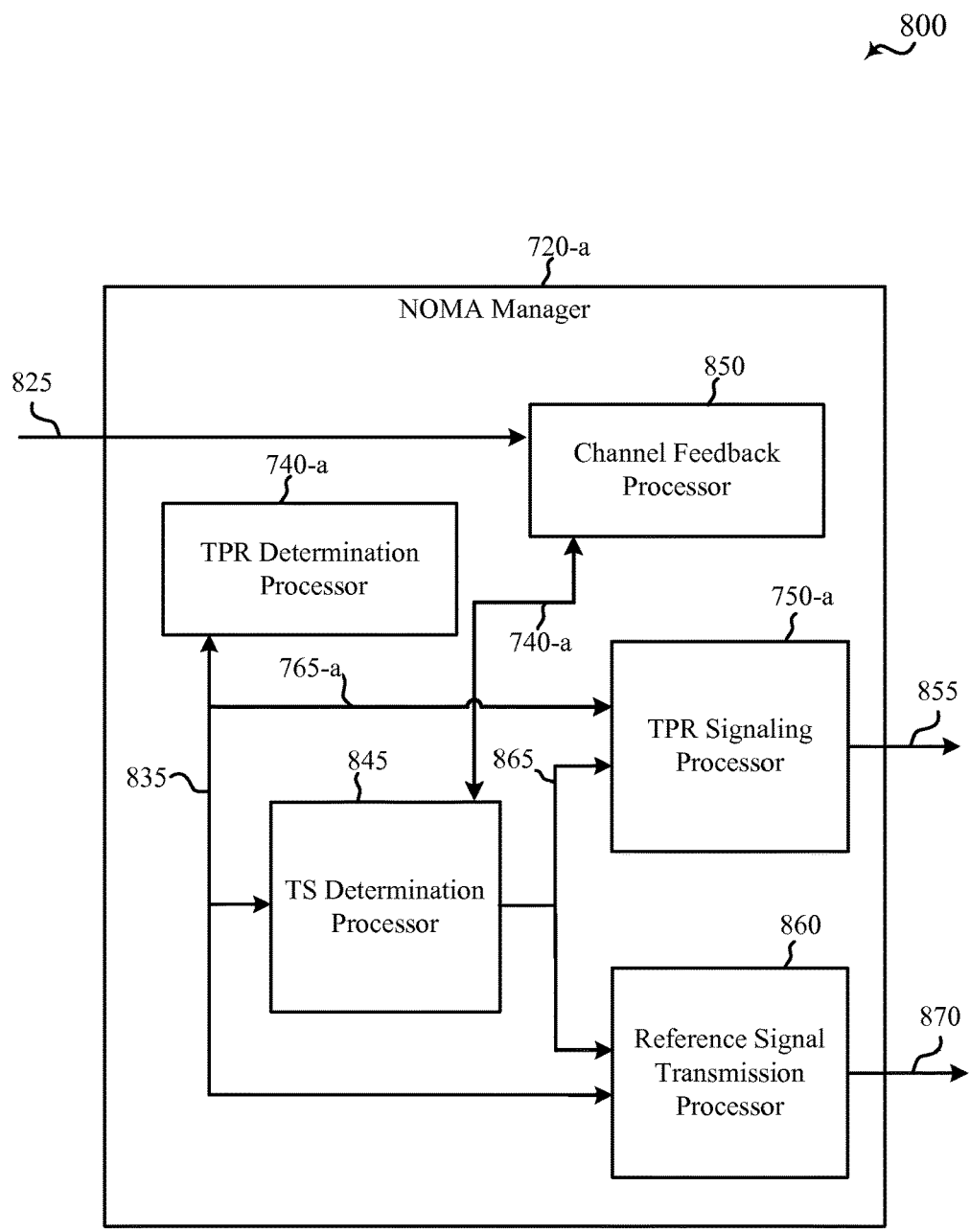
FIG. 8 shows a block diagram of another apparatus for use in wireless communication, in accordance with various aspects of the present disclosure.

FIG. 8 shows a block diagram 800 of a NOMA manager 720-a for use in wireless communication, in accordance with various aspects of the present disclosure. In some examples, the NOMA manager 720-a may be an example of aspects of the NOMA manager 720 of FIG. 7 and may be coupled with a receiver and/or transmitter in some cases. The NOMA manager 720-a may also be a processor.

The components of the NOMA manager 720-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The NOMA manager 720-a may be used to manage some or all of the non-orthogonal wireless communications to/from one or more of the base stations 105, 205, or 305 described with reference to FIG. 1A, 1B, 2, 3 or 4A-4C. In some examples, the NOMA manager 720-a may include a TPR determination processor 740-a, a TS determination processor 845, a TPR signaling processor 750-a, a channel feedback processor 850, and a reference signal transmission processor 860. In some cases, channel feedback processor 850 may receive channel feedback reports 825 from one or more UEs, which may include all or part of one or more CQI reports.

In some examples, the TPR determination processor 740-a may be used to determine one or more TPR pairs 765-a for potential NOMA transmissions to one or more UEs, where each TPR pair includes a first TPR between a base layer and a reference signal and a second TPR between an enhancement layer and the reference signal. The TPR determination processor 740-a may pass the one or more TPR pairs 765-a to the TPR signaling processor 750-a, which may transmit signaling 855 (e.g., via a transmitter), to the one or more UEs indicating, for example a first TPR and a second TPR for NOMA transmissions over a non-orthogonal channel. The TPR signaling processor 750-a, in certain examples, may be used to transmit signaling 855 that provides TPR pairs 765-a and a transmission strategy category 865 associated with each TPR pair 765-a determined by the TS determination processor 845. The signaling 855, in some examples, may be transmitted via RRC signaling.

In some examples, the TS determination processor 845 may determine one or more transmission strategy categories 865 for transmissions between the base station and UE. The TPR determination processor 740-a, in such examples, may determine one or more pairs of TPR values 835 for each transmission strategy category 865, with each pair of TPR values 835 comprising an associated first TPR value for base layer data transmissions and an associated second TPR value for enhancement layer data transmissions. In certain examples, the transmission strategy category 865 may be determined based on spatial layer sharing of a transmission strategy. In such examples, a first pair of TPR values may be associated with transmission strategies that use spatial layer sharing and a second pair of TPR values may be associated with transmission strategies that do not use spatial layer sharing.

In some examples, the reference signal transmission processor 860 may be used to transmit one or more reference signals 870 according to TPR values of the TPR pairs 765-a. The reference signals may include, for example, one or more of a CRS, CSI-RS, or DM-RS.

Figure 9:
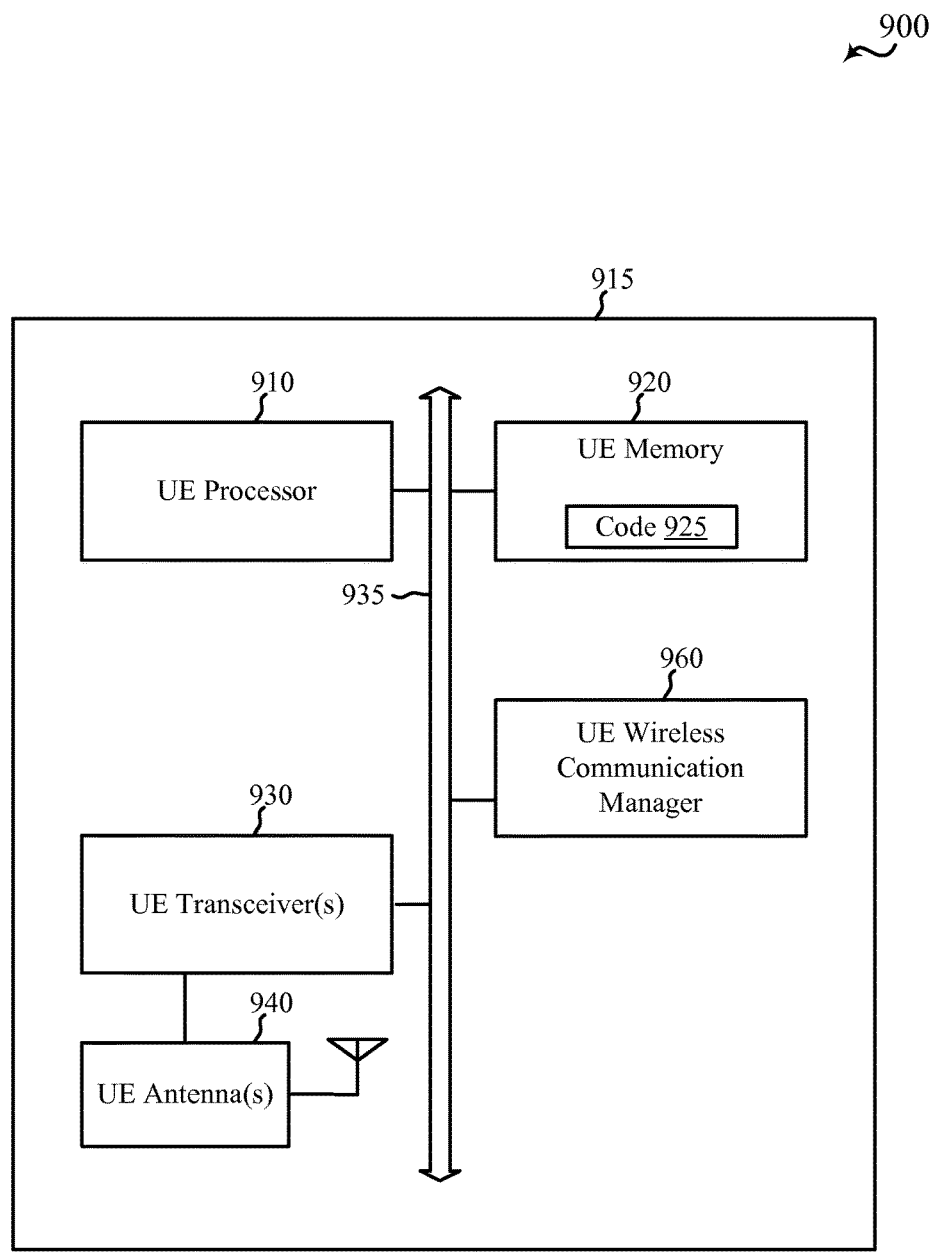
FIG. 9 shows a block diagram of a UE for use in wireless communication, in accordance with various aspects of the present disclosure.

FIG. 9 shows a block diagram 900 of a UE 915 for use in wireless communication, in accordance with various aspects of the present disclosure. The UE 915 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 915 may, in some examples, have an internal power supply (not shown), such as a small battery, to facilitate mobile operation. In some examples, the UE 915 may be an example of aspects of one or more of the UEs 115, 215, 315, or 415 described with reference to FIG. 1A, 1B, 2, 3, or 4, or aspects of one or more of the apparatus 515 described with reference to FIG.

5. The UE 915 may be configured to implement at least some of the UE and/or apparatus features and functions described with reference to one or more of FIG. 1A, 1B, 2, 3, 4A-4C, 5, or 6.

The UE 915 may include a UE processor 910, UE memory 920, one or more UE transceiver(s) 930, one or more UE antenna(s) 940, and/or a UE wireless communication manager 960. Each of these components may be in communication with each other, directly or indirectly, over one or more buses 935.

The UE memory 920 may include random access memory (RAM) and/or read-only memory (ROM). The UE memory 920 may store computer-readable, computer-executable code 925 containing instructions that are configured to, when executed, cause the UE processor 910 to perform various functions described herein related to wireless communication and/or communication using NOMA communication techniques. Alternatively, the code 925 may not be directly executable by the UE processor 910 but be configured to cause the UE 915 (e.g., when compiled and executed) to perform various of the functions described herein.

The UE processor 910 may include an intelligent hardware device, e.g., a central processing unit (CPU), a microcontroller, an ASIC, etc. The UE processor 910 may process information received through the UE transceiver(s) 930 and/or information to be sent to the UE transceiver(s) 930 for transmission through the UE antenna(s) 940. The UE processor 910 may handle, alone or in connection with the UE wireless communication manager 960, various aspects of wireless communication for the UE 915. UE processor 910 may, for example, manage transitions of the UE 915 between an RRC idle state and an RRC connected state, and may be in communication with other components of the UE 915, directly or indirectly, over the one or more buses 935.

The UE transceiver(s) 930 may include a modem configured to modulate packets and provide the modulated packets to the UE antenna(s) 940 for transmission, and to demodulate packets received from the UE antenna(s) 940. The UE transceiver(s) 930 may, in some examples, be implemented as one or more UE transmitters and one or more separate UE receivers. The UE transceiver(s) 930 may support communications in the first radio frequency spectrum band and/or the second radio frequency spectrum band. The UE transceiver(s) 930 may be configured to communicate bi-directionally, via the UE antenna(s) 940, with one or more of the base stations 105, 205, or 305 described with reference to FIG. 1A, 1B, 2, 3, or 4A-4C, or with one or more of the apparatus 705 of FIG. 7. While the UE 915 may include a single UE antenna, there may be examples in which the UE 915 may include multiple UE antennas 940.

The UE wireless communication manager 960 may be configured to perform and/or control some or all of the features and/or functions described with reference to one or more of FIG. 1A, 1B, 2, 3, 4A-4C, 5, or 6 related to wireless communication, including some or all of the features and/or functions related to NOMA communication techniques for a UE. The UE wireless communication manager 960, or portions of it, may include a processor, and/or some or all of the functions of the UE wireless communication manager 960 may be performed by the UE processor 910 and/or in connection with the UE processor 910. In some examples, the UE wireless communication manager 960 may be an example of the wireless communication managers 520 described with reference to FIG. 5 or 6.

Figure 10:
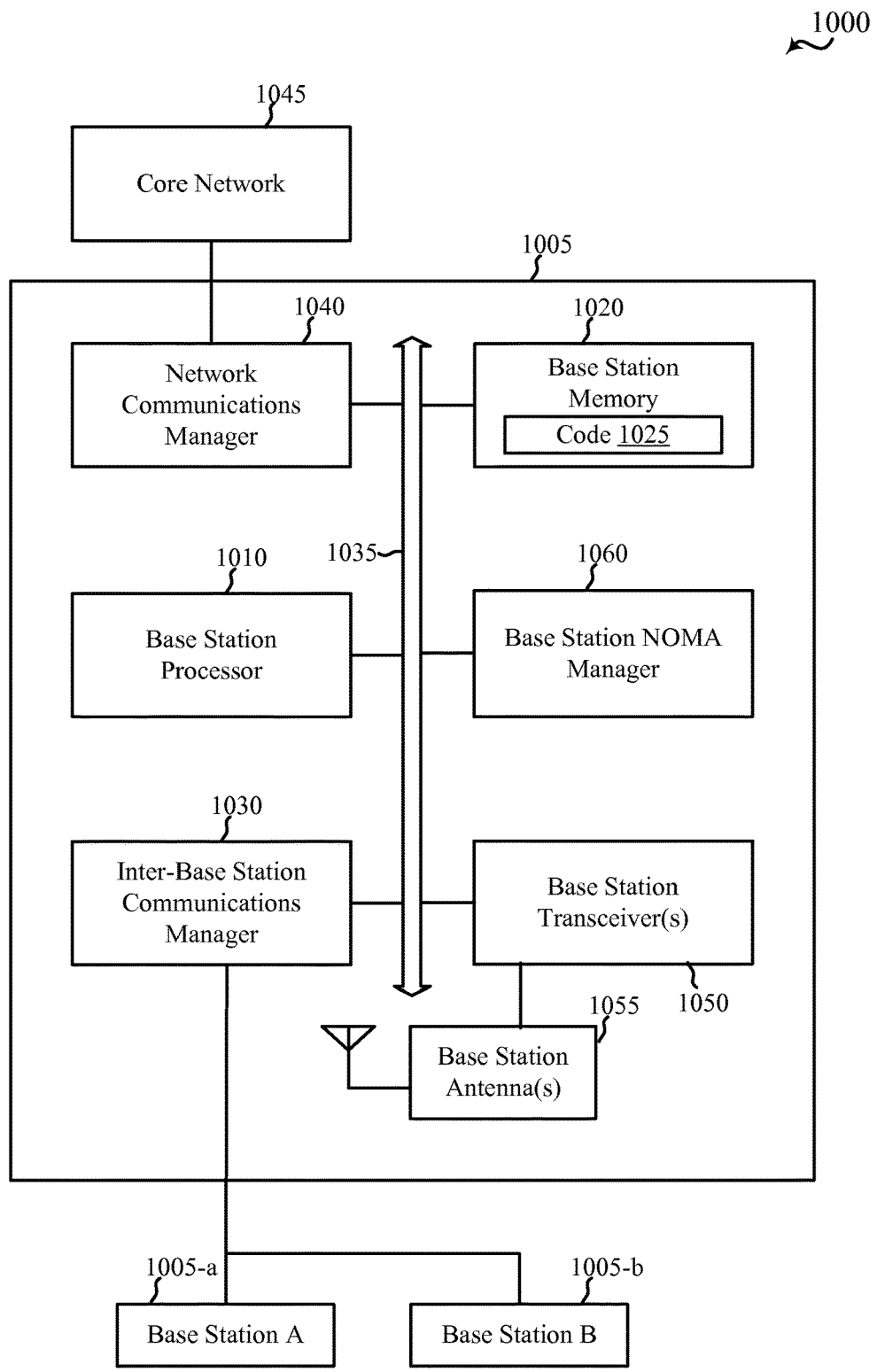
FIG. 10 shows a block diagram of a base station (e.g., a base station forming part or all of an eNB) for use in wireless communication, in accordance with various aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of aspects of one or more of the base stations 105, 205, or 305 described with reference to FIG. 1A, 1B, 2, 3, or 4A-4C, or aspects of one or more of the apparatus 705 described with reference to FIG. 7. The base station 1005 may be configured to implement or facilitate at least some of the base station and/or device features and functions described with reference to FIG. 1A, 1B, 2, 3, 4A-4C, 7, or 8.

The base station 1005 may include a base station processor 1010, a base station memory 1020, at least one base station transceiver module (represented by base station transceiver(s) 1050), at least one base station antenna (represented by base station antenna(s) 1055), and a base station NOMA manager 1060. The base station 1005 may also include one or more of an inter-base station communications manager 1030 and/or a network communications manager 1040. Each of these components may be in communication with each other, directly or indirectly, over one or more buses 1035.

The base station memory 1020 may include RAM and/or ROM. The base station memory 1020 may store computer-readable, computer-executable code 1025 containing instructions that are configured to, when executed, cause the base station processor module 1010 to perform various functions described herein related to wireless communication and/or communication using NOMA communication techniques. Alternatively, the code 1025 may not be directly executable by the base station processor 1010 but be configured to cause the base station 1005 (e.g., when compiled and executed) to perform various of the functions described herein.

The base station processor 1010 may include an intelligent hardware device, e.g., a CPU, a microcontroller, an ASIC, etc. The base station processor 1010 may process information received through the base station transceiver(s) 1050, the inter-base station communications manager 1030, and/or the network communications manager 1040. The base station processor 1010 may also process information to be sent to the transceiver(s) 1050 for transmission through the antenna(s) 1055, to the inter-base station communications manager 1030, for transmission to one or more other base stations 1005-a and 1005-b, and/or to the network communications manager 1040 for transmission to a core network 1045, which may be an example of one or more aspects of the core network 130 described with reference to FIG. 1A or FIG. 1B. The base station processor 1010 may handle, alone or in connection with the base station NOMA manager 1060, various aspects of wireless communication for the base station 1005.

The base station transceiver(s) 1050 may include a modem configured to modulate packets and provide the modulated packets to the base station antenna(s) 1055 for transmission, and to demodulate packets received from the base station antenna(s) 1055. The base station transceiver(s) 1050 may, in some examples, be implemented as one or more base station transmitters and one or more separate base station receivers. The base station transceiver(s) 1050 may support communications in the one or more radio frequency spectrum bands. The base station transceiver(s) 1050 may be configured to communicate bi-directionally, via the antenna(s) 1055, with one or more UEs or apparatuses, such as one or more of the UEs 115, 215, 315, or 915 described with reference to FIG. 1A, 1B, 2, 3, 4A-4C or 9, or one or more of the apparatus 515 described with reference to FIG. 5. The base station 1005 may, for example, include multiple base station antennas 1055 (e.g., an antenna array). The base station 1005 may communicate with the core network 1045 through the network communications manager 1040. The base station 1005 may also communicate with other base stations, such as the base stations 1005-*a* and 1005-*b*, using the inter-base station communications manager 1030.

The base station NOMA manager 1060 may be configured to perform and/or control some or all of the features and/or functions described with reference to one or more of FIG. 1A, 1B, 2, 3, 4A-4C, 7, or 8, related to wireless communication, including some or all of the features and/or functions related to NOMA communication techniques for a base station. The base station NOMA manager 1060, or portions of it, may include a processor, and/or some or all of the functions of the base station NOMA manager 1060 may be performed by the base station processor 1010 and/or in connection with the base station processor 1010.

Figure 11:
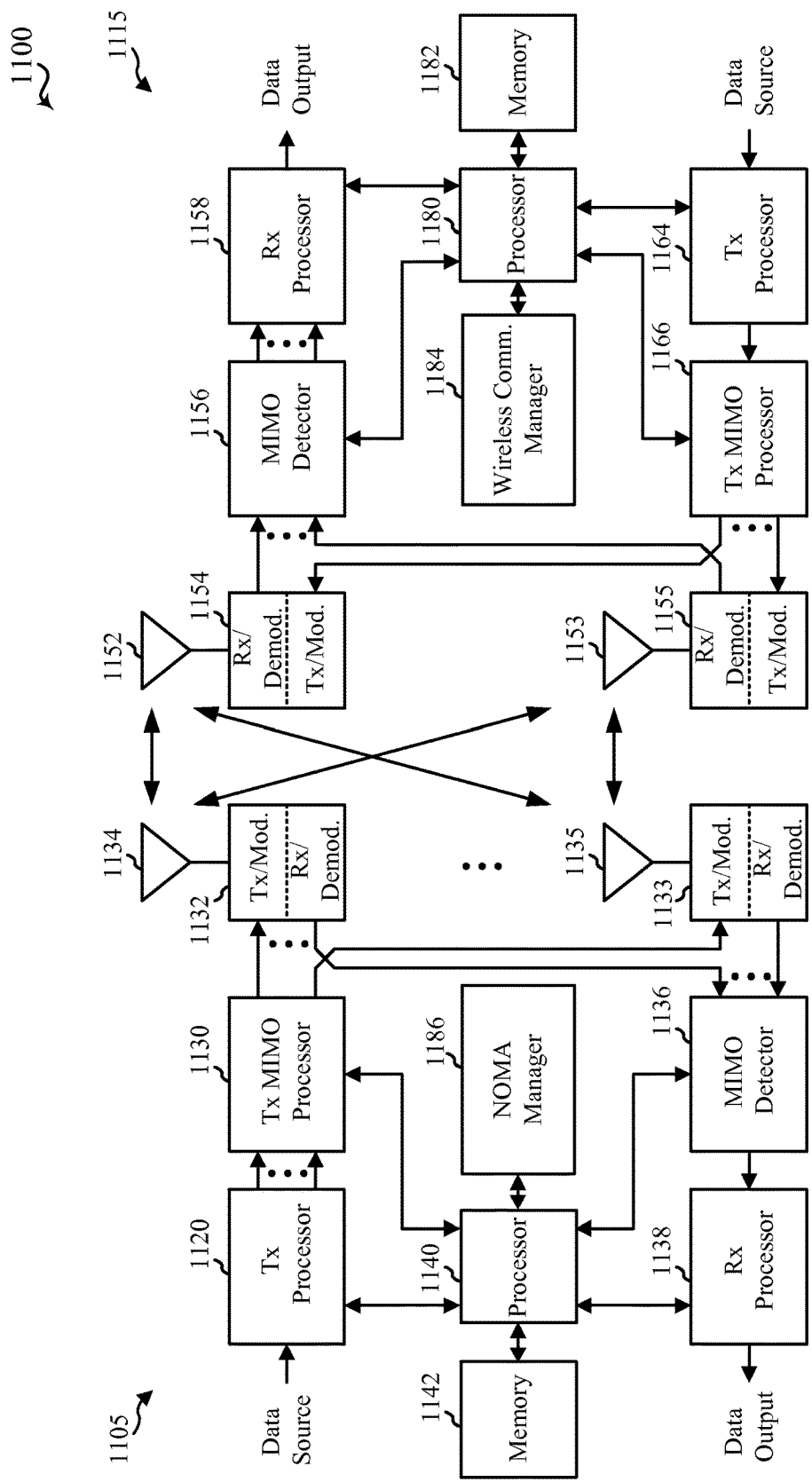
FIG. 11 is a block diagram of a MIMO communication system including a base station and a UE, in accordance with various aspects of the present disclosure.

FIG. 11 is a block diagram of a MIMO communication system 1100 including a base station 1105 and a UE 1115, in accordance with various aspects of the present disclosure. The MIMO communication system 1100 may illustrate aspects of the wireless communication system 100 described with reference to FIG. 1A or FIG. 1B. In some examples, the base station 1105 may be an example of aspects of one or more of the base stations 105, 205, 305, or 1005 described with reference to FIG. 1A, 1B, 2, 3, 4A-4C, or 10, or aspects of one or more of the apparatus 705 described with reference to FIG. 7. In some examples, the UE 1115 may be an example of aspects of one or more of the UEs 115, 215, 315, or 915 described with reference to FIG. 1A, 1B, 2, 3, 4A-4C, or 9, or aspects of one or more of the apparatus 515 described with reference to FIG. 5. The base station 1105 may be equipped with antennas 1134 through 1135, and the UE 1115 may be equipped with antennas 1152 through 1153. In the MIMO communication system 1100, the base station 1105 may be able to send data over multiple communication links at the same time. Each communication link may be processed according to multiple-antenna techniques including SU-MIMO, MU-MIMO, and/or NOMA. For SU-MIMO, the "rank" of the communication link may indicate the number of spatial layers used for communication. For example, in a 2×2 MIMO communications system where base station 1105 transmits two spatial layers, the rank of the communication link between the base station 1105 and the UE 1115 is two.

At the base station 1105, a transmit processor 1120 may receive data from a data source. The transmit processor 1120 may process the data. The transmit processor 1120 may also generate control symbols and/or reference symbols. A transmit (TX) MIMO processor 1130 may perform spatial processing (e.g., precoding) on data symbols, control symbols, and/or reference symbols, if applicable, and may provide output symbol streams to the transmit modulators 1132 through 1133. Each modulator 1132 through 1133 may process a respective output symbol stream (e.g., for OFDM, etc.) to obtain an output sample stream. Each modulator 1132 through 1133 may further process (e.g., convert to analog, amplify, filter, and upconvert) the output sample stream to obtain a DL signal. In one example, DL signals from modulators 1132 through 1133 may be transmitted via the antennas 1134 through 1135, respectively.

At the UE 1115, the UE antennas 1152 through 1153 may receive the DL signals from the base station 1105 and may provide the received signals to the demodulators 1154 through 1155, respectively. Each demodulator 1154 through 1155 may condition (e.g., filter, amplify, downconvert, and digitize) a respective received signal to obtain input samples. Each demodulator 1154 through 1155 may further process the input samples (e.g., for OFDM, etc.) to obtain received symbols. A MIMO detector 1156 may obtain received symbols from all the demodulators 1154 through 1155, perform MIMO detection on the received symbols, if applicable, and provide detected symbols. A receive processor 1158 may process (e.g., demodulate, deinterleave, and decode) the detected symbols, providing decoded data for the UE 1115 to a data output, and provide decoded control information to a processor 1180, or memory 1182.

The processor 1180 may in some cases execute stored instructions to instantiate a wireless communication manager 1184. The wireless manager 1184 may be an example of aspects of the wireless communication manager 520, 520-*a*, or 960 described with reference to FIG. 5, 6, or 9.

On the uplink (UL), at the UE 1115, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulators 1154 through 1155 (e.g., for SC-FDMA, etc.), and be transmitted to the base station 1105 in accordance with the transmission parameters received from the base station 1105. At the base station 1105, the UL signals from the UE 1115 may be received by the antennas 1134 through 1135, processed by the demodulators 1132 through 1133, detected by a MIMO detector 1136 if applicable, and further processed by a receive processor 1138. The receive processor 1138 may provide decoded data to a data output and to the processor 1140 and/or memory 1142. The processor 1140 may in some cases execute stored instructions to instantiate a NOMA manager 1186. The NOMA manager 1186 may be an example of aspects of the NOMA manger 720, 720-*a*, or 1060 described with reference to FIG. 7, 8, or 10.

The components of the UE 1115 may, individually or collectively, be implemented with one or more ASICs adapted to perform some or all of the applicable functions in hardware. Each of the noted components may be a means for performing one or more functions related to operation of the MIMO communication system 1100. Similarly, the components of the base station 1105 may, individually or collectively, be implemented with one or more ASICs adapted to perform some or all of the applicable functions in hardware. Each of the noted components may be a means for performing one or more functions related to operation of the MIMO communication system 1100.

Figure 12:
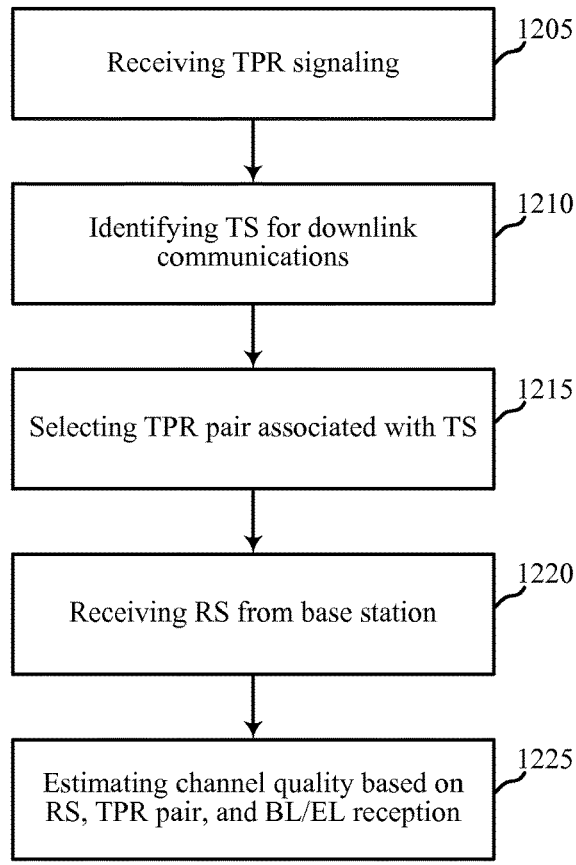
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs 115, 215, 315, 915, or 1115 described with reference to FIG. 1A, 1B, 2, 3, 4A-4C, 9 or 11, or aspects of one or more of the apparatus 515 described with reference to FIG. 5. In some examples, a UE and/or apparatus may execute one or more sets of codes to control the functional elements of the UE and/or apparatus to perform the functions described below. Additionally or alternatively, the UE and/or apparatus may perform one or more of the functions described below using special-purpose hardware.

At block 1205, the method 1200 may include receiving TPR signaling. The TPR signaling may include, for example, one or more values of TPRs for a base modulation layer and an enhancement modulation layer. In some examples, the TPR signaling may include one or more TPR pairs that each contain TPR values for a base modulation layer and an enhancement modulation layer. The operation(s) at block 1205 may be performed using the receiver 510 of FIG. 5, the wireless communication managers 520 described with reference to FIG. 5 or 6, the UE antennas 940 and UE transceiver(s) 930 of FIG. 9, or the UE antennas 1152 through 1153, demodulators 1154 through 1155 and associated receive components of FIG. 11.

At block 1210, the method 1200 may include identifying a TS for downlink communications. The identifying a TS may, in some examples, include identifying a category of TS for communications. The operation(s) at block 1210 may be performed using the wireless communication managers 520, 960, and/or 1184 described with reference to FIGS. 5, 6, 9, and/or 11, or the TS category processor 645 described with reference to FIG. 6.

At block 1215, the method 1200 may include selecting a TPR pair associated with a TS. The selecting a TPR pair may, in some examples, include selecting a TPR pair based on a category of TS, such as, for example, selecting a first TPR pair TSs with spatial layer sharing, and selecting a second TPR pair for TSs without spatial layer sharing. The operation(s) at block 1215 may be performed using the wireless communication manager 520, 960, and/or 1184 described with reference to FIGS. 5, 6, 9, and/or 11, or the TPR processors 540 described with reference to FIG. 5 or 6.

At block 1220, the method 1200 may include receiving a reference signal from base station. The reference signal may include, for example, one or more of a C-RS, CSI-RS, or DM-RS. The operation(s) at block 1220 may be performed using the receiver 510 of FIG. 5, the wireless communication manager 520 described with reference to FIG. 5 or 6, the UE antennas 964 and UE transceiver(s) 930 of FIG. 9, or the UE antennas 1152 through 1153, demodulators 1154 through 1155 and associated receive components of FIG. 11.

At block 1225, the method 1200 may include estimating channel quality based on RS, TPR pair, and base layer and/or enhancement layer reception. The operation(s) at block 1215 may be performed using the wireless communication manager 520, 960, and/or 1184 described with reference to FIGS. 5, 6, 9, and/or 11, or the channel quality estimators 550 described with reference to FIG. 5 or 6.

Thus, the method 1200 may provide for wireless communication. It should be noted that the method 1200 is just one implementation and that the operations of the method 1200 may be rearranged or otherwise modified such that other implementations are possible.

Figure 13:
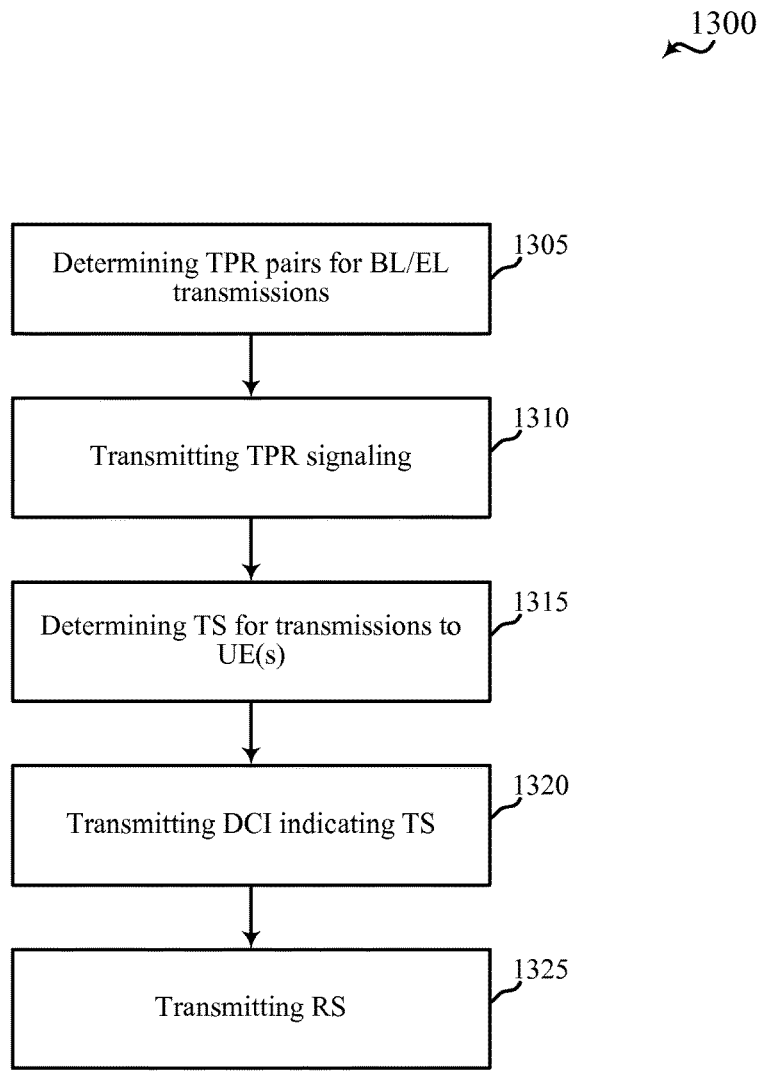
FIG. 13 is a flow chart illustrating an example of another method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105, 205, 305, 1005, or 1105 described with reference to FIG. 1A, 1B, 2, 3, 4A-4C, 10, or 11, or aspects of one or more of the apparatus 705 described with reference to FIG. 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the method 1300 may include determining TPR pairs for base layer and enhancement layer transmissions. The TPR pairs may include, for example, one or more values of TPRs for a base modulation layer and an enhancement modulation layer. The operation(s) at block 1305 may be performed using the NOMA managers 720, 1060, or 1186 of FIG. 7, 8, 10, or 11, or the TPR determination processors 740 of FIG. 7 or 8.

At block 1310, the method 1300 may include transmitting TPR signaling. The TPR signaling may be transmitted using, for example, PDCCH signaling or RRC signaling. The operation(s) at block 1310 may be performed using the transmitter 730 described with reference to FIG. 7, the NOMA managers 720 described with reference to FIG. 7 or 8, the base station antennas 1055 and base station transceiver(s) 1050 of FIG. 10, or the base station antennas 1134 through 1135, modulators 1132 through 1133 and associated transmit components of FIG. 11.

At block 1315, the method 1300 may include determining a TS for transmissions to UE(s). The operation(s) at block 1315 may be performed using the NOMA manager 720, 720-a, 1060, or 1186 of FIG. 7, 8, 10, or 11, the TPR determination processors 740 of FIG. 7 or 8, or the TS determination processor 845 of FIG. 8.

At block 1320, the method 1300 may include transmitting DCI indicating the TS. The operation(s) at block 1320 may be performed using the transmitter 730 described with reference to FIG. 7, the NOMA managers 720 described with reference to FIG. 7 or 8, the base station antennas 1055 and base station transceiver(s) 1050 of FIG. 10, or the base station antennas 1134 through 1135, modulators 1132 through 1133 and associated transmit components of FIG. 11.

At block 1325, the method 1300 may include transmitting a reference signal. The reference signal may include, for example, one or more of a CRS, CSI-RS, or DM-RS. The operation(s) at block 1315 may be performed using the transmitter 730 described with reference to FIG. 7, the NOMA manager 720 described with reference to FIG. 7 or 8, the base station antennas 1055 and base station transceiver(s) 1050 of FIG. 10, or the base station antennas 1134 through 1135, modulators 1132 through 1133 and associated transmit components of FIG. 11.

Thus, the method 1300 may provide for wireless communication. It should be noted that the method 1300 is just one implementation and that the operations of the method 1300 may be rearranged or otherwise modified such that other implementations are possible.

In some examples, aspects of one or more of the methods 1200 or 1300 described with reference to FIG. 12 or 13 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE), comprising:
   receiving, from a base station, information for determining traffic-to-pilot power ratio (TPR) values from two or more pairs of TPR values configured for a non-orthogonal channel;
   determining, from the two or more pairs of TPR values based at least in part on the information, a pair of TPR values to be used for a first TPR for a base layer for the non-orthogonal channel and a second TPR for an enhancement layer for the non-orthogonal channel;
   receiving at least a portion of a reference signal transmitted over the non-orthogonal channel; and
   estimating channel quality for the base layer or the enhancement layer based at least in part on an energy level of the received reference signal and one or more of the first TPR or the second TPR.

2. The method of claim 1, wherein the determining the pair of TPR values to be used for the first TPR and the second TPR comprises:

determining which of one or more transmission strategy categories is to be used for downlink transmissions from a base station to the UE over the non-orthogonal channel; and selecting, based at least in part on the transmission strategy category to be used, the pair of TPR values to be used for the first TPR and the second TPR from the two or more pairs of TPR values, each pair of TPR values associated with at least one of the one or more transmission strategy categories.

3. The method of claim 2, further comprising:
receiving signaling from the base station that provides the two or more pairs of TPR values and a transmission strategy category associated with each pair of TPR values.

4. The method of claim 3, wherein the signaling is received via radio resource control (RRC) signaling.

5. The method of claim 2, wherein the determining which of the one or more transmission strategy categories is based at least in part on spatial layer sharing of respective transmission strategies, and wherein a first pair of TPR values is associated with transmission strategies that use spatial layer sharing and a second pair of TPR values is associated with transmission strategies that do not use spatial layer sharing.

6. The method of claim 1, wherein the reference signal is one or more of a cell-specific reference signal (CRS) or a channel state information reference signal (CSI-RS).

7. The method of claim 1, wherein the information is received via a physical downlink control channel (PDCCH), and wherein the information received via the PDCCH comprises one or more of precoding matrix information, spatial layer sharing information, TPR information, or interference cancellation information.

8. The method of claim 7, wherein the interference cancellation information comprises an interference cancellation flag, and wherein a first pair of TPR values are to be used for the first TPR and the second TPR when the interference cancellation flag is set, and a second pair of TPR values are to be used for the first TPR and the second TPR when the interference cancellation flag is cleared.

9. The method of claim 7, wherein the two or more pairs of TPR values are received via radio resource control (RRC) signaling.

10. The method of claim 9, wherein the information comprises an indication of which of the two or more pairs of TPR values are to be selected for the first TPR and the second TPR.

11. The method of claim 1, further comprising:
receiving a demodulation reference signal (DM-RS) of a data transmission over the non-orthogonal channel; and
demodulating the data transmission based at least in part on a TPR value for the received DM-RS.

12. The method of claim 11, wherein the TPR value for the received DM-RS is a sum of the first TPR and the second TPR.

13. The method of claim 11, wherein the TPR value for the received DM-RS is independent of one or more of the first TPR or the second TPR.

14. The method of claim 11, wherein the DM-RS is associated with one of a plurality of antenna ports of the non-orthogonal channel, and wherein the one of the plurality of antenna ports is selected for estimating the channel quality based on whether the UE is to receive base layer transmissions or enhancement layer transmissions.

15. The method of claim 14, wherein a transmit power for data transmissions for the base layer transmissions or the enhancement layer transmissions corresponds to a DM-RS power of the respective base layer or enhancement layer.

16. An apparatus for wireless communication at a user equipment (UE), comprising:
a processor;
memory in electronic communication with the processor; and
instructions stored in the memory, the instructions being executable by the processor to:
receive, from a base station, information for determining traffic-to-pilot power ratio (TPR) values from two or more pairs of traffic-to-pilot power ratio (TPR) values configured for a non-orthogonal channel;
determine, from the two or more pairs of TPR values based at least in part on the information, a pair of TPR values to be used for a first TPR for a base layer of the non-orthogonal channel and a second TPR for an enhancement layer for the non-orthogonal channel;
receive at least a portion of a reference signal of the non-orthogonal channel; and
estimate channel quality for the base layer or the enhancement layer based at least in part on an energy level of the received reference signal and one or more of the first TPR or the second TPR.

17. The apparatus of claim 16, wherein the instructions are further executable by the processor to determine the pair of TPR values to be used by:
determining which of one or more transmission strategy categories is to be used for downlink transmissions from a base station to the UE over the non-orthogonal channel; and
selecting, based at least in part on the transmission strategy category to be used, the pair of TPR values to be used for the first TPR and the second TPR from the two or more pairs of TPR values, each pair of TPR values associated with at least one of the one or more transmission strategy categories.

18. The apparatus of claim 17, wherein the instructions are further executable by the processor to:
receive signaling from the base station that provides the two or more pairs of TPR values and a transmission strategy category associated with each pair of TPR values.

19. The apparatus of claim 16, wherein the information is received via a physical downlink control channel (PDCCH), and wherein the information received via the PDCCH comprises one or more of precoding matrix information, spatial layer sharing information, TPR information, or interference cancellation information.

20. The apparatus of claim 19, wherein the interference cancellation information comprises an interference cancellation flag, and wherein a first pair of TPR values are to be used for the first TPR and the second TPR when the interference cancellation flag is set, and a second pair of TPR values are to be used for the first TPR and the second TPR when the interference cancellation flag is cleared.

21. The apparatus of claim 16, wherein the instructions are further executable by the processor to:
receive a demodulation reference signal (DM-RS) of a data transmission over the non-orthogonal channel, and
demodulate the data transmission based least in part on a TPR value for the received DM-RS.

22. The apparatus of claim 21, wherein the TPR value for the received DM-RS is a sum of the first TPR and the second TPR, or is independent of one or more of the first TPR or the second TPR.

23. The apparatus of claim 21, wherein the DM-RS is associated with one of a plurality of antenna ports of the non-orthogonal channel, and wherein the one of the plurality of antenna ports is selected for channel quality estimation based on whether the UE is to receive base layer transmissions or enhancement layer transmissions.

24. The method of claim 1, further comprising:
transmitting a channel information feedback report comprising the estimated channel quality.

25. The method of claim 1, further comprising:
transmitting a channel information feedback report comprising the estimated channel quality for the base layer and the enhancement layer.

26. The method of claim 2, further comprising:
transmitting a channel information feedback report comprising the estimated channel quality for each of the two or more pairs of TPR values.

27. The apparatus of claim 16, wherein the instructions are further executable by the processor to:
transmit a channel information feedback report comprising the estimated channel quality.

28. The apparatus of claim 16, wherein the instructions are further executable by the processor to:
transmit a channel information feedback report comprising the estimated channel quality for the base layer and the enhancement layer.

29. The apparatus of claim 17, wherein the instructions are further executable by the processor to:
transmit a channel information feedback report comprising the estimated channel quality for each of the two or more pairs of TPR values.

* * * * *